United States Patent
Yokoyama et al.

(10) Patent No.: US 10,878,456 B2
(45) Date of Patent: Dec. 29, 2020

(54) MOBILE DEVICE LINK SYSTEM AND SERVICE INFORMATION DISTRIBUTION METHOD

(71) Applicant: MAXELL, LTD., Kyoto (JP)

(72) Inventors: Toru Yokoyama, Tokyo (JP); Takashi Matsubara, Tokyo (JP)

(73) Assignee: MAXELL, LTD., Kyoto (JP)

(*) Notice: Subject to any disclaimer, the term of this patent is extended or adjusted under 35 U.S.C. 154(b) by 70 days.

(21) Appl. No.: 16/341,079

(22) PCT Filed: Nov. 30, 2016

(86) PCT No.: PCT/JP2016/085571
§ 371 (c)(1),
(2) Date: Apr. 11, 2019

(87) PCT Pub. No.: WO2018/100684
PCT Pub. Date: Jun. 7, 2018

(65) Prior Publication Data
US 2019/0236648 A1    Aug. 1, 2019

(51) Int. Cl.
*G06Q 30/02* (2012.01)
*H04W 4/021* (2018.01)
*H04W 60/04* (2009.01)
*H04W 64/00* (2009.01)
*H04M 11/00* (2006.01)
(Continued)

(52) U.S. Cl.
CPC ......... *G06Q 30/0261* (2013.01); *G06F 13/00* (2013.01); *G06Q 30/02* (2013.01);
(Continued)

(58) Field of Classification Search
USPC ....................................................... 705/14.1
See application file for complete search history.

(56) References Cited

U.S. PATENT DOCUMENTS 7,435,179 B1 * 10/2008 Ford ..................... A63F 13/12
463/42
8,306,503 B2 * 11/2012 Morrison .............. H04W 12/08
455/411
(Continued)

FOREIGN PATENT DOCUMENTS

| CN | 103997771 A | 8/2014 |
| JP | 2010-198557 A | 9/2010 |

(Continued)

OTHER PUBLICATIONS

International Search Report of PCT/JP2016/085571 dated Feb. 14, 2017.
(Continued)

*Primary Examiner* — Afaf Osman Bilal Ahmed
(74) *Attorney, Agent, or Firm* — Mattingly & Malur, PC

(57) ABSTRACT

A mobile device link system in which, to a mobile device detected by position information measurement to have entered a distribution area, recommendation information corresponding to the distribution area which the mobile device has entered is distributed; to a mobile device detected by local communication to have entered a local communication area, right information indicating that the mobile device has the right to receive service information is transmitted; and using the right information, service information is requested and service information is received.

14 Claims, 46 Drawing Sheets

(51) Int. Cl.
  *G06F 13/00* (2006.01)
  *H04W 76/15* (2018.01)
  *G09F 19/00* (2006.01)

(52) U.S. Cl.
  CPC ......... *G06Q 30/0277* (2013.01); *G09F 19/00* (2013.01); *H04M 11/00* (2013.01); *H04W 4/021* (2013.01); *H04W 60/04* (2013.01); *H04W 64/003* (2013.01); *H04W 76/15* (2018.02)

(56) References Cited

U.S. PATENT DOCUMENTS

| | | | | |
|---|---|---|---|---|
| 9,786,176 | B2 * | 10/2017 | Northrup | ............ G07F 17/3237 |
| 2014/0379479 | A1 | 12/2014 | Zeniya | |

FOREIGN PATENT DOCUMENTS

| | | |
|---|---|---|
| JP | 2012-185168 A | 9/2012 |
| JP | 2013-223158 A | 10/2013 |
| JP | 2015-005051 A | 1/2015 |
| JP | 2015-070424 A | 4/2015 |
| JP | 2015-158939 A | 9/2015 |

OTHER PUBLICATIONS

Chinese Office Action received in corresponding Chinese Application No. 201680088885.2 dated May 29, 2020.

Japanese Office Action received in corresponding Japanese Application No. 2018-553577 dated Oct. 1, 2019.

\* cited by examiner

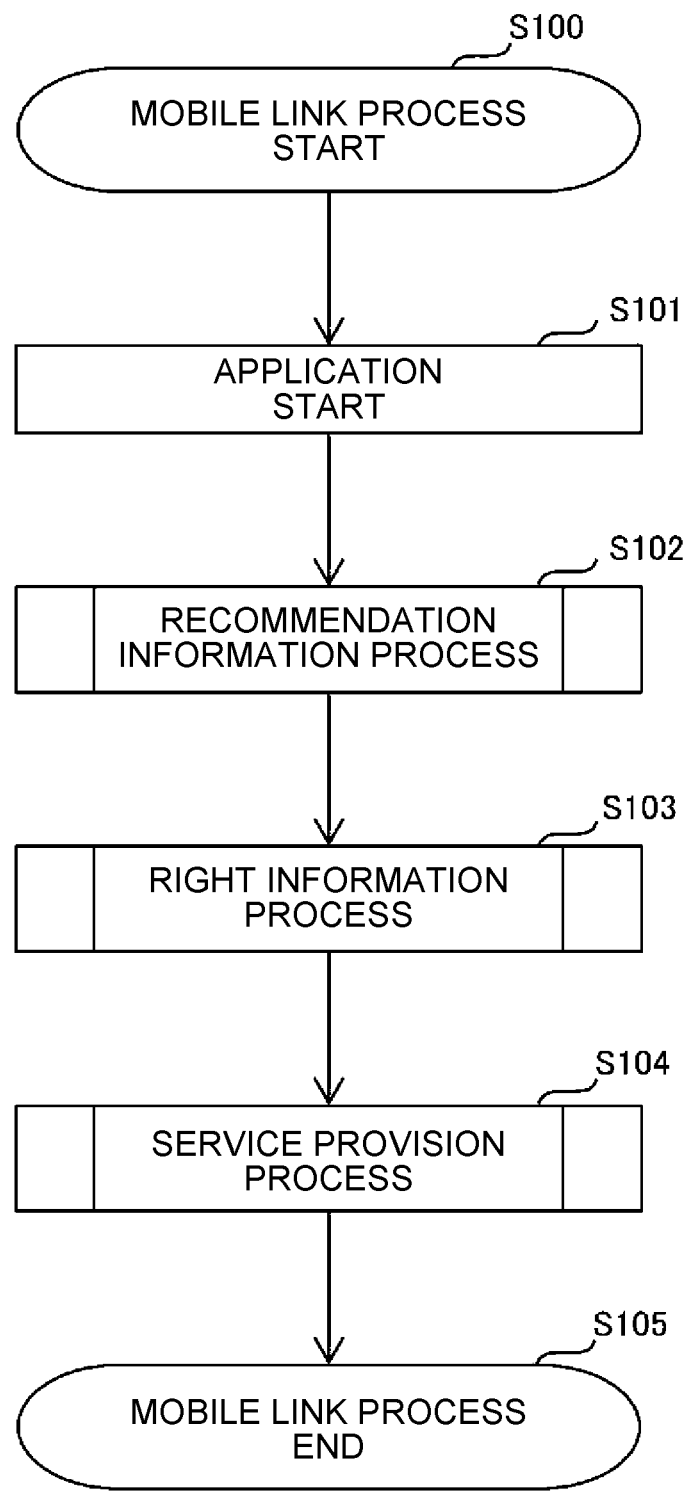

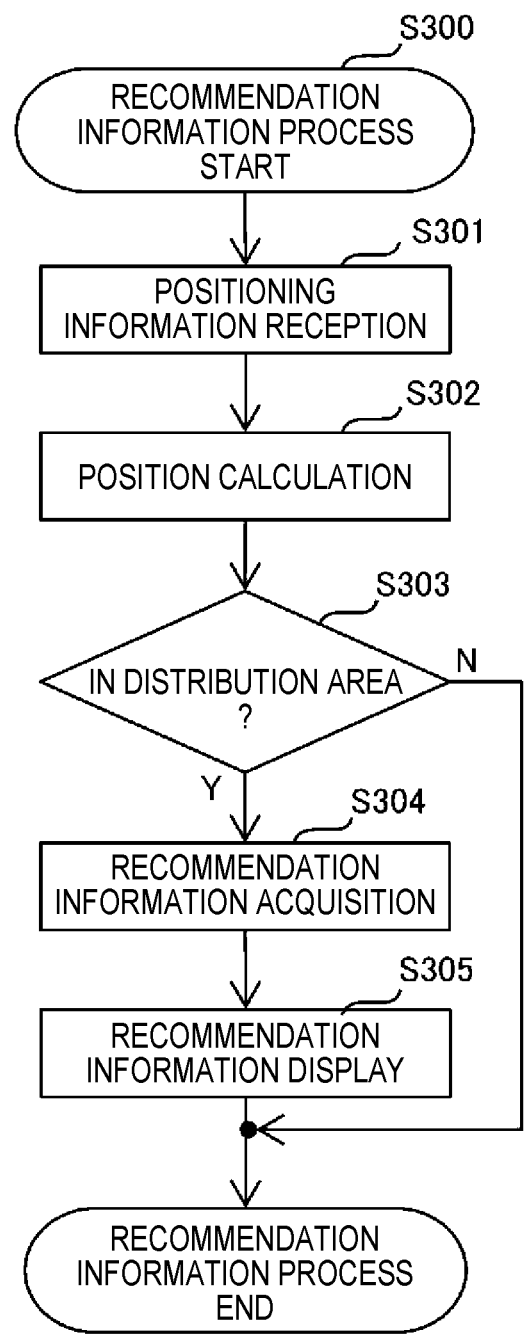

| ID | CENTRAL COORDINATES | RADIUS |
|---|---|---|
| ID1 | (X1,Y1) | R1 |
| ID2 | (X2,Y2) | R2 |
| ID3 | (X3,Y3) | R3 |
| ⋮ | ⋮ | ⋮ |

400

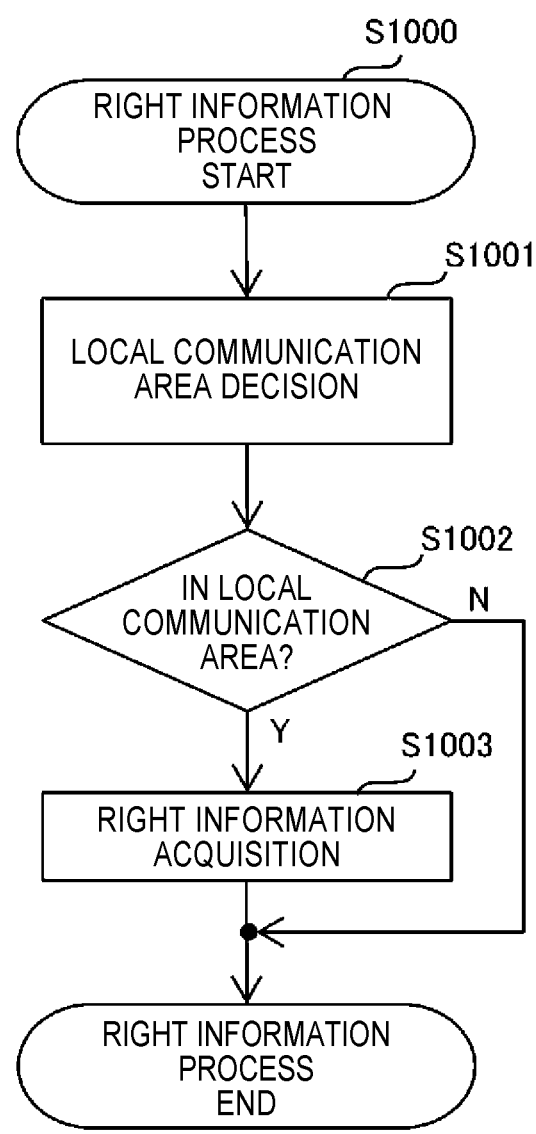

PARTICIPANT RECRUITING SCREEN
(MOBILE DEVICE)

PARTICIPATION RECEPTION SCREEN
(SHARED MONITOR)

PARTICIPATION
ACCPETANCE SCREEN

PARTICIPATION ACCEPTANCE SCREEN
(WAITING MODE)

PARTICIPANT RECRUITING SCREEN

APPLICATION PERIOD END SCREEN

APPLICATION PERIOD END SCREEN

SCREEN FOR PARTICIPANTS

COMPETITOR CANDIDATE AREA INFORMATION

COMPETITOR RECRUITING SCREEN

PARTICIPATION ACCEPTANCE SCREEN

PARTICIPATION ACCEPTANCE SCREEN

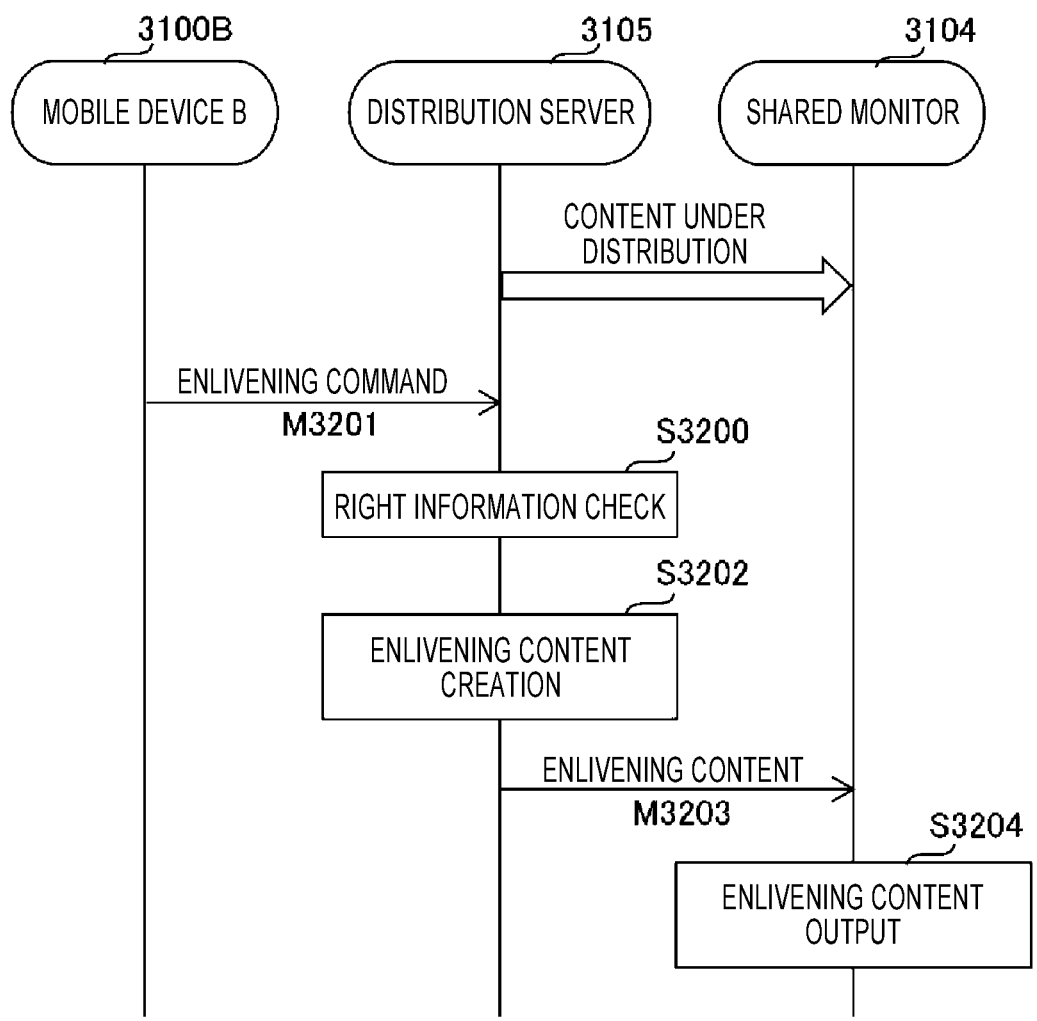

SOUND EFFECT SELECTION SCREEN

FEELING SELECTION SCREEN

QUESTIONNAIRE SCREEN

| AREA | DISTRIBUTED CONTENT | LIVELINESS | NO. OF CONNECTIONS | "LIKES" COUNT |
|---|---|---|---|---|
| A | XXXXXXX | 76.4 | 49 | 329 |
| B | YYYYYYY | 60.2 | 37 | 142 |
| C | YYYYYYY | 56.5 | 29 | 129 |
|  |  |  |  |  |

TABULATION OF AREA LIVELINESS

CHANGE IN LIVELINESS OVER TIME

USER INFORMATION ACQUISITION SCREEN

USER ACTION UI SCREEN

USER ACTION RESPONSE SCREEN

SCREEN FOR ENTRY OF DEVICE ID AND RIGHT INFORMATION ID

USER ACTION LIST       4300

| LINKED ID | TIME | USER ACTION CONTENT |
|---|---|---|
| MID1 | 2016/04/24:10:00 | SNAP SHOT |
| MID1 | 2016/04/24:10:30 | SNAP SHOT |
| MID1 | 2016/04/24:11:30 | RECORD (START) |
| MID1 | 2016/04/24:11:32 | RECORD (END) |
| MID1 | 2016/04/24:12:10 | CM INFORMATION ACQUISITION |
| ⋮ | ⋮ | ⋮ |

FIG. 43B

DISTRIBUTED CONTENT LIST    4301

| TIME | CONTENT |
|---|---|
| 2016/04/24:10:00 ~ 2016/04/24:12:00 | SOCCER BROADCAST |
| 2016/04/24:12:00 ~ 2016/04/24:12:15 | LOCAL CM |
| ⋮ | ⋮ |

MOBILE DEVICE LINK SYSTEM AND SERVICE INFORMATION DISTRIBUTION METHOD

TECHNICAL FIELD

The present invention relates to a mobile device link system and a service information distribution method and more particularly to content distribution using mobile device position information and local communication functionality.

BACKGROUND ART

Patent Literature 1 discloses a technique "which transmits a coupon to a terminal device (excerpt from the specification)" using a wireless communication device "which makes wireless communication with one or more terminal devices by local wireless communication and includes: a communication section for receiving a terminal device identifier for identifying a terminal device from the terminal device; a control section for ending the communication between the terminal device identified by the terminal device identifier and the communication section when the communication section receives the terminal device identifier; and a processing section for performing data processing for service to the user of the terminal device identified by the terminal device identifier using the terminal device identifier received by the communication section (excerpt from the abstract)".

Patent Literature 2 discloses a technique in which "an advertisement information providing apparatus receives departure place coordinate information and destination coordinate information from a terminal device and creates route information indicating the route from the departure place to the destination. Also, the advertisement information providing apparatus extracts advertisement information according to the route information and sends it to the terminal device. Therefore, the terminal device can display advertisement information related to the route from the departure place to the destination (excerpt from the abstract)".

CITATION LIST

Patent Literature

PATENT LITERATURE 1: JP-A No. 2013-223158
PATENT LITERATURE 2: JP-A No. 2012-185168

SUMMARY OF INVENTION

Technical Problem

In Patent Literature 1, the area where a coupon can be sent is limited to a local wireless communication area. Meanwhile, in Patent Literature 2, since unwanted advertisements are occasionally displayed along the route, if the user is in a remote place from the above area where a coupon can be sent, advertisement information suitable for the remote place is also displayed occasionally, which is bothersome for the user. Therefore, in fact, a technique to achieve both coupon distribution in a limited area and attraction of more customers to the limited area is demanded.

The present invention has been made in view of the above circumstances and has an object to provide a technique which enables both transmission of specific information in a limited area and attraction of customers to the limited area.

Solution to Problem

In order to solve the above problem, the present invention has the configuration described in the claims. For example, the present invention provides a service information distribution method including a server, a mobile device communication-connected to the server via a network, and a local communication device communication-connected to the server via the network, characterized by including: a step of acquiring position information of the mobile device; a step in which the server or the mobile device decides whether or not the mobile device has entered a distribution area including an outside of a local communication area of the local communication device, according to the position information; the step in which, if the mobile device is decided to have entered the distribution area, the server creates and sends recommendation information to recommend the user having the mobile device to move to a place of installation of the local communication device; the step in which the mobile device receives the recommendation information; the step in which the mobile device makes a display according to the recommendation information for the user; the step in which the mobile device receives local communication device identifying information to identify the local communication device uniquely through local wireless communication with the local communication device; the step in which the mobile device creates a right information request message for requesting the server right information indicating that the mobile device has right to receive service information from the server, the right information request message containing the local communication device identifying information, and sends the message to the server; the step in which the server receives the right information request message; the step in which, in response to the right information request message, the server creates a right response message containing right information associated with the local communication device, according to the local communication device identifying information, and sends back the message to the mobile device; the step in which the mobile device sends a service request message containing the right information and requesting distribution of the service information, to the server; the step in which the server performs authentication according to the right information contained in the service request message; the step in which, if the authentication is successful, the server creates and distributes a service response message containing the service information for the mobile device; and the step in which the mobile device receives the service response message.

Advantageous Effects of Invention

According to the present invention, a technique which sends specific information in a limited area and attracts customers to the limited area can be provided. Other objects, features and advantageous effects will become apparent from the embodiments described below.

BRIEF DESCRIPTION OF DRAWINGS

FIG. 1B is a flowchart of the mobile device link process according to the first embodiment of the present invention.

FIG. 3 is a flowchart of a first example of the recommendation information process according to the first embodiment of the present invention.

FIG. 10A is a flowchart of a first example of the right information process according to the first embodiment of the present invention.

FIG. 32 shows the flow of a first example of communication in the mobile device link system according to the fourth embodiment of the present invention.

FIG. 43B is a conceptual diagram of the user action list and distribution content list according to the sixth embodiment of the present invention.

DESCRIPTION OF EMBODIMENTS

Next, embodiments of the present invention will be described referring to the accompanying drawings. In the accompanying drawings, functionally the same elements may be designated by the same reference numbers. The accompanying drawings show concrete embodiments and implementation examples which conform to the principle of the present invention and these are intended for understanding of the present invention and should never be used to interpret the present invention in a limited manner.

In the embodiments, an explanation will be given in a sufficiently detailed manner for those skilled in the art to embody the present invention, but other implementations and forms can be made and it should be understood that modifications of the configuration/structure and replacement of various elements can be made without departing from the scope and spirit of the technical idea of the present invention. Therefore, the description given below should not be interpreted as limited to it.

Furthermore, as will be described later, embodiments of the present invention may be implemented as software which runs on a general-purpose computer or may be implemented as dedicated hardware or a combination of software and hardware.

Hereinafter, various processes in an embodiment of the present invention will be explained on the assumption that each processing section as a "program" (for example, control section, position information measuring section, right information management section, etc.) is the subject (actor); however, since a prescribed process is performed using a memory and communication port (communication control device) by execution of the program by a processor, an explanation may be made given with the processor as the subject. The program may be, in part or in whole, implemented by dedicated hardware or modularized.

(1) First Embodiment

Figure 1A:
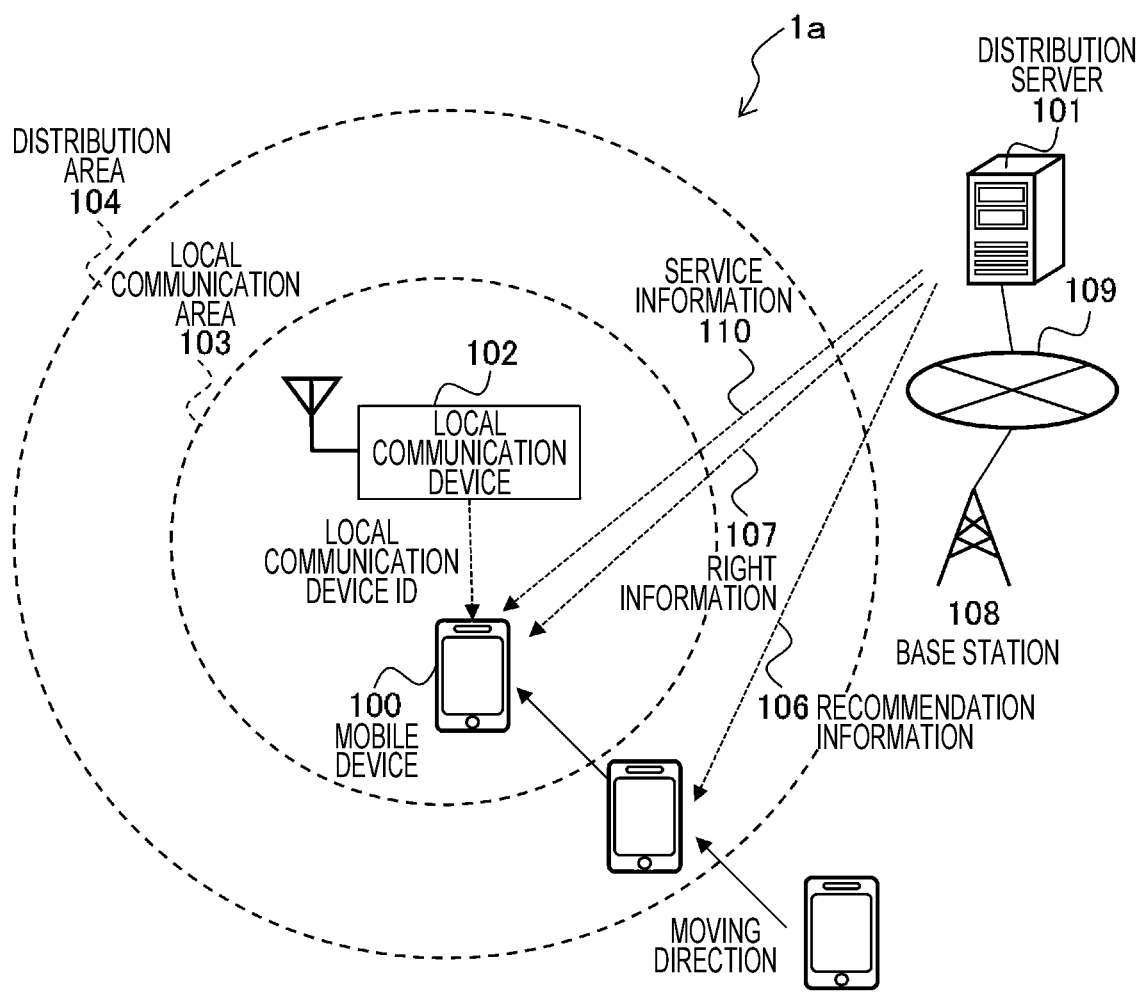
FIG. 1A is a diagram which shows the configuration of a mobile device link system according to a first embodiment of the present invention.

FIG. 1A is a diagram which shows an example of the configuration of a mobile device link system 1 according to the first embodiment of the present invention. The mobile device link system 1 in the figure includes a mobile device 100, distribution server 101, and local communication device 102, in which the distribution server 101 links the mobile device 100 and the local communication device 102.

The mobile device 100 can be connected to an internet 109 by wireless communication service provided by a mobile carrier through a base station 108 and can communicate with the distribution server 101 via the internet. The internet described here is an example of a public line communication network. In the figure, a distribution area 104 where information is distributed from the distribution server 101 and a local communication area 103 where communication with the local communication device 102 can be made are set. The distribution area 104 may be set as an area which includes and superimposes the local communication area 103 or the distribution area 104 may be set as a roughly doughnut-like area along the outer border of the local communication area 103. In the figure, the mobile device 100 is assumed to be present in an area where communication through the base station 108 can be made, and outside the distribution area 104.

The information distributed by the distribution server 101 includes right information 107 to indicate ownership of the right to receive service and recommendation information 106 to notify the user of the mobile device 100 of existence of the service or provision of the service. The distribution server 101 distributes the right information 107 to the mobile device 100 only when it can confirm that the mobile device 100 has entered the local communication area 103. The distribution server 101 also sends the recommendation information 106 when the mobile device 100 has entered the distribution area 104 from an area outside the distribution area 104. In the local communication area 103, a service information 110 is sent from the local communication device 102 to the mobile device 100.

The mobile device 100 and the local communication device 102 communicate with each other by local wireless communication. Here, local wireless communication may be Bluetooth (registered trademark) or wireless LAN, typically Wi-Fi (registered trademark) or the NFC (Near Field Communication) standard used in traffic IC cards, or other short-range wireless communication. In the case of local communication by wireless LAN, the local communication device 102 serves as an AP (access point) and sends a Beacon packet storing the information required for communication such as SSID, ESSID and coding information at regular intervals. In the case of local wireless communication by Bluetooth (registered trademark), one example is "Bluetooth (registered trademark) Low Energy" (hereinafter called BLE) which enables communication with low power consumption and small capacity and a typical standard thereof is "iBeacon (registered trademark)". In the case of local wireless communication by iBeacon (registered trademark), the local communication device 102 sends a beacon signal storing the UUID (Universally Unique Identifier) of the device. Hereinafter, in this embodiment, an explanation will be given mainly of the case that local wireless communication is BLE, but the present invention can be generally applied even when any other wireless communication is used.

FIG. 1B is a flowchart of the mobile device link process according to the first embodiment of the present invention. The mobile device link process (S100) starts when the program (application) to link the mobile device 100 to the mobile device link system 1 is started at the mobile device 100 (S101). At this time, the mobile device 100 is assumed to be present outside the distribution area 104. As the mobile device 100 moves into the distribution area 104, the recommendation information process (S102) is performed.

As the mobile device 100 further moves and enters the local communication area 103, the right information process (S103) is performed. Using the right information obtained by this process, the service provision process (S104) is performed.

When the main power of the mobile device 100 is turned off or operation to stop the application is done, the mobile device link process is ended.

Figure 2A:
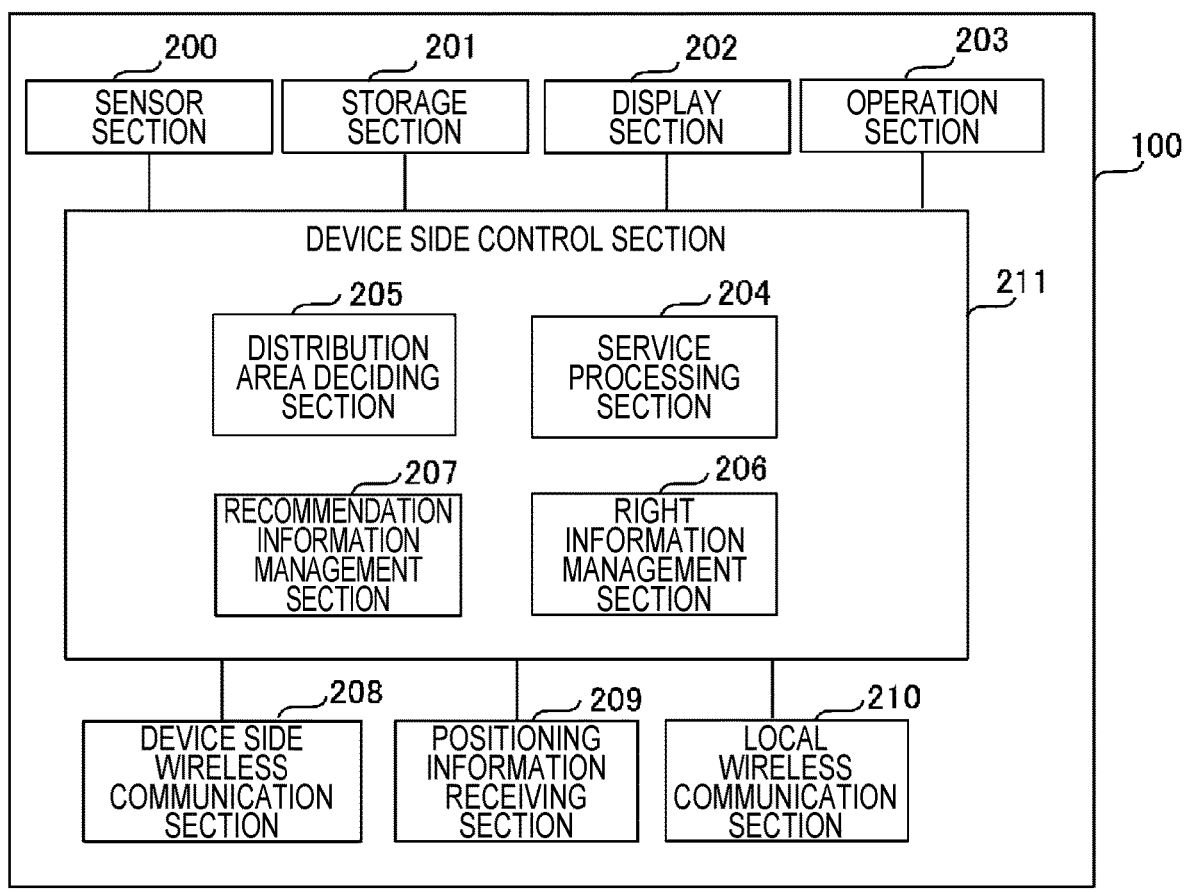
FIG. 2A is a block diagram of the mobile device according to the first embodiment of the present invention.

FIG. 2A is a block diagram which shows the structure of the mobile device 100 according to an embodiment of the present invention.

A mobile side control section 211 includes a service processing section 204, distribution area deciding section 205, right information management section 206, and recommendation information management section 207, which will be described later. In this figure, only the functions related to the present invention are shown in the mobile side control section 211 and other general control functions for operation of the device are omitted. The mobile side control section 211 may be structured by the CPU (Central Processing Unit) mounted in the mobile device 100 which loads the program to be executed by the mobile side control section 211, in a RAM (Random Access Memory) and executes it. The distribution server 101, which will be described later, may include a distribution area deciding section 255. In that case, the distribution area deciding section 205 of the mobile device 100 is omissible.

A sensor section 200 is a device which detects the sound, light and motion of the mobile device 100, such as a microphone, camera or acceleration sensor.

A storage section 201 is, for example, an SSD (Solid State Drive) or attachable/detachable memory card such as an SD card and stores and reads information according to a command from the mobile side control section 211.

A display section 202 is a drawing device such as a liquid crystal display or organic EL display and displays an image signal supplied from the mobile side control section 211. An operation section 203 includes user interfaces such as a touch panel, physical buttons and keys.

The operation section 203 may be a touch panel stacked on the screen of the display section 202.

A mobile side wireless communication section 208 has the function to make wireless communication with the base station 108 provided by the mobile carrier. The mobile device 100 accesses the internet 109 by the wireless communication session established by the mobile side wireless communication section 208 so that it can communicate with the distribution server 101.

A positioning signal receiving section 209 has the function to receive the positioning signal used to measure the position of the mobile device 100. An example of the positioning signal is a radio wave transmitted by GPS (Global Positioning System).

A local wireless communication section 210 has the function for local wireless communication with the local communication device 102. If local wireless communication is BLE, the local wireless communication section 210 receives a beacon signal transmitted by the local communication device 102. This beacon signal contains ID information to identify the local communication device 102. In the area deciding process which will be described later, this ID information can associate the mobile device with the local communication device 102 near which it is present. Furthermore, the local wireless communication section 210 can estimate the distance between the local communication device 102 and the mobile device 100 by using the received signal strength (Received Signal Strength Indication, hereinafter RSSI) value of the Bluetooth (registered trademark) signal and if the distance is not more than a given distance, it can decide as in the area.

Figure 2B:
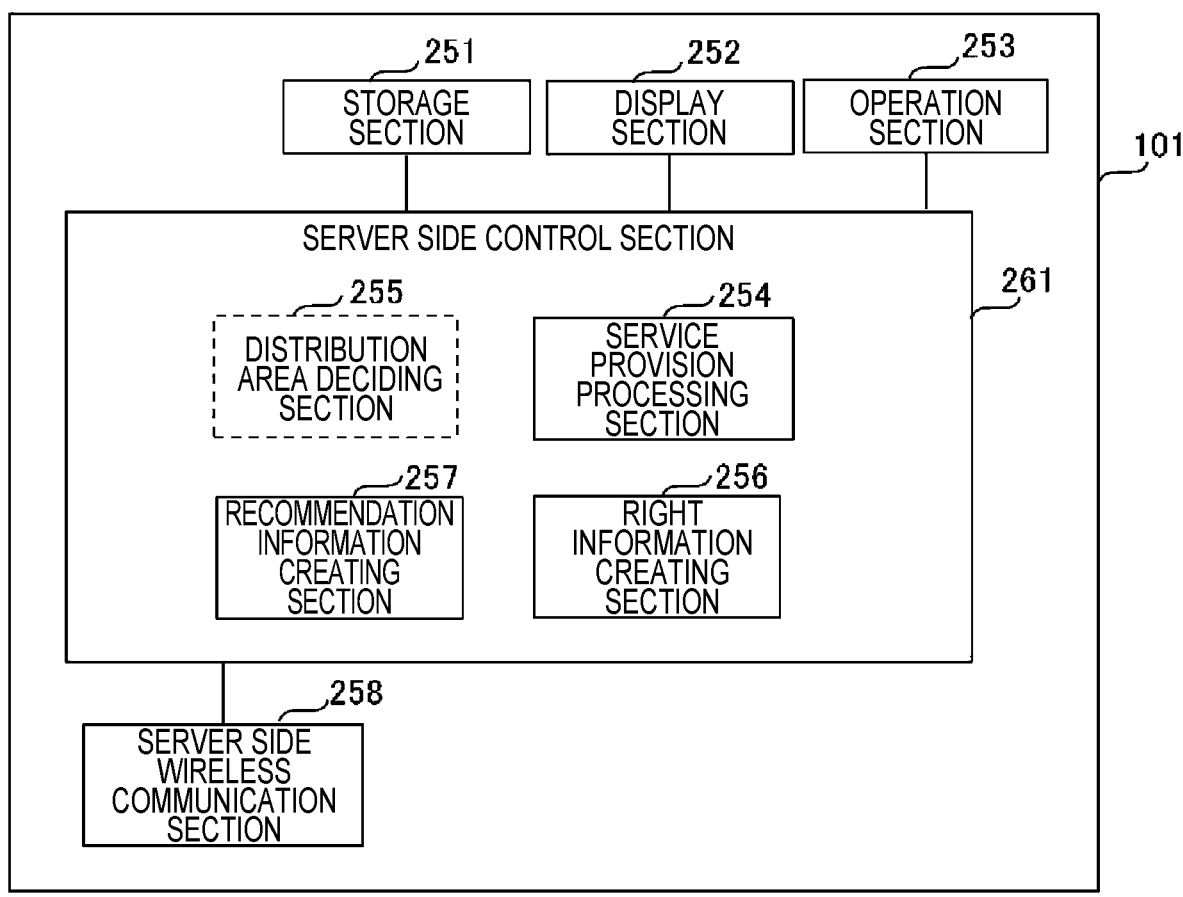
FIG. 2B is a block diagram which shows the structure of the distribution server according to an embodiment of the present invention.

FIG. 2B is a block diagram which shows the structure of the distribution server 101 according to an embodiment of the present invention.

Like the mobile device 100, the distribution server 101 includes a storage section 251, display section 252, operation section 253, server side wireless communication section 258, and server side control section 261. The server side control section 261 includes a service provision processing section 254, distribution area deciding section 255, right information creating section 256, and recommendation information creating section 257 which will be described later. In this figure, only the functions related to the present invention are shown in the server side control section 261 and other general control functions for operation of the device are omitted. The service provision processing section 254 also functions as an advertisement processing section in advertisement distribution service, as a command execution section for a game command in game distribution service, or as a command execution section for a drawing command in drawing service.

Furthermore, the local communication device includes a device side local wireless communication section which locally communicates the local communication device identifying information to identify the local communication device uniquely and a device side communication section which communicates with the distribution server 101 via the internet 109 wirelessly or by wire, though not shown.

(Recommendation Information Process)

The recommendation information management section 207 in the mobile side control section 211 performs the recommendation information process S300 at regular time intervals. This time interval may be previously stored in the storage section 201 or a fixed value predetermined in the program under which the mobile side control section 211 operates.

FIG. 3 is a flowchart which shows the flow of the recommendation information process S300. At Step S301, the positioning signal receiving section 209 receives a positioning signal. At step S302, the distribution area deciding section 205 acquires time information from signals which the positioning signal receiving section 209 receives from a plurality of GPS satellites, and calculates the position of the mobile device 100. At Step S302, the position information need not always be calculated in the distribution area deciding section 205. For example, GPS signal information may be sent to an external position information server (not shown) through the mobile side wireless communication section 208 so that the position information calculated in the position information server is received through the mobile side wireless communication section 208. If the mobile carrier provides a position information server, position information measurement can be made with higher accuracy by combining the radio wave receiving condition from the base station.

At Step S303, the distribution area deciding section 205 decides whether or not the mobile device 100 is present in the distribution area 104, according to the position information acquired at Step S302. For this decision, the mobile device 100 may previously receive the information related to the distribution area from the distribution server 101 and store it in the storage section 201.

Figures 4, 5:
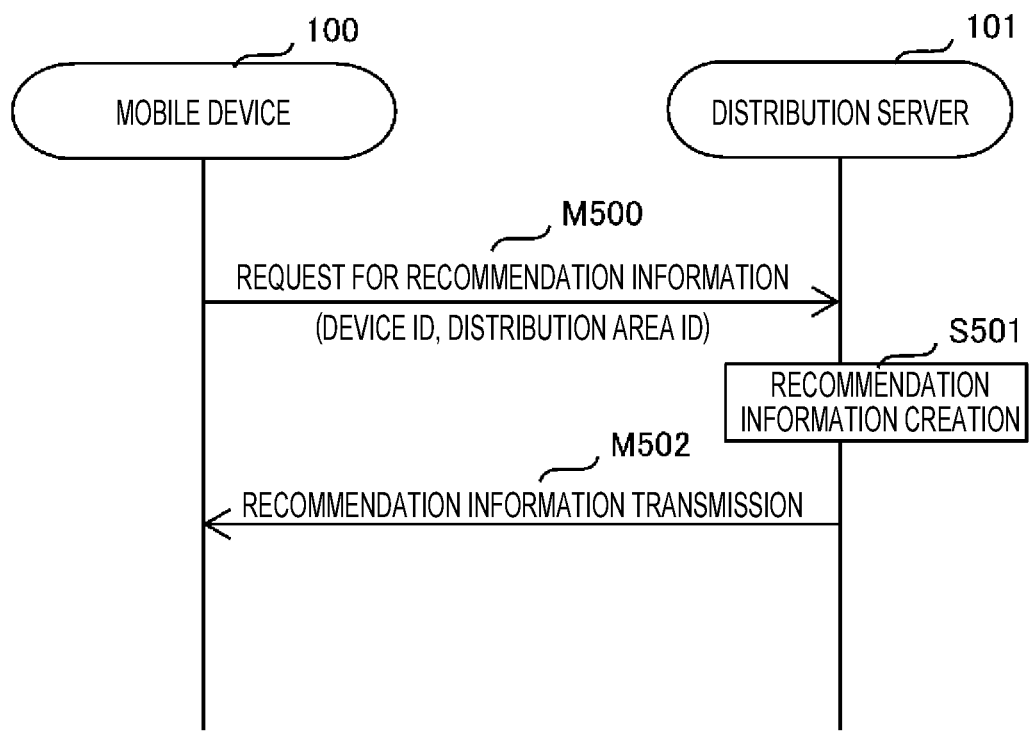
FIG. 4 is a conceptual diagram of distribution area information according to the first embodiment of the present invention.
FIG. 5 shows the flow of a first example of communication in recommendation information acquisition according to the first embodiment of the present invention.

FIG. 4 shows an example of a distribution area information 400. The distribution area information 400 contains a distribution area ID, latitude/longitude central coordinates, and the area radius. The distribution area deciding section 205 refers to the distribution area information 400, calculates the distance to the central coordinates with respect to the position information acquired at Step S302 and the distribution area indicated by each ID, and if the distance is within the area radius, it decides that the mobile device 100 is present in the distribution area and if not so, it decides that the mobile device 100 is outside the distribution area. For calculation of the distance to the central coordinates, a known method such as the Hubeny formula may be used. At Step S303, if the mobile device 100 is decided to be not present in any distribution area, the recommendation information process S300 is ended. If the mobile device 100 is decided to be present in the distribution area 104, recommendation information acquisition (S304) is performed.

FIG. 5 shows the flow of communication between the mobile device 100 and the distribution server 101 in recommendation information acquisition (S304). This communication is made when communication via the internet 109 can be made between the mobile device 100 and the distribution server 101 through the mobile side wireless communication section 208 and the server side wireless communication section 258.

The mobile device 100 sends a recommendation information request message M500 from the mobile side wireless communication section 208 to the distribution server 101. The recommendation information request message M500 contains a device ID and a distribution area ID. The device ID is identifying information to identify the mobile device 100 and may be anything that can identify the device: for example, it may be the manufacturing number of the mobile device 100, phone number, IP address or MAC address. The distribution area ID is an identifier corresponding to the distribution area 104 as the area in which at Step S303 it is decided that the mobile device 100 is present.

As the server side wireless communication section 258 of the distribution server 101 receives the recommendation information request message M500, the recommendation information creating section 257 creates recommendation information suitable for the distribution area ID (S501). In recommendation information creation (S501), recommendation information suitable for the distribution area ID is created. The recommendation information, which is determined for each distribution area, is a content including an image and characters and may be in the form of image data or in the form of a script language describing the content, such as HTML. The recommendation information may differ in content not only with each distribution area ID but also with the time of transmission of the recommendation information request message M500. Also, the recommendation information request message M500 may include such information as the age and sex of the user to change the recommendation information content according to the user profile.

Figure 6:
FIG. 6 shows an example of the recommendation information screen according to the first embodiment of the present invention.

FIG. 6 shows an example of the recommendation information screen. Desirably the recommendation information screen shows a content which gives information on the after-mentioned service provided in the local communication area 103 and induces the user to move to the local communication area 103. In the figure, the momentarily changing information such as the number of remaining persons for service may be reflected in the recommendation information. For the recommendation information, a deadline may be set in order to give the user an impression that the service is limited. In this case, the recommendation information screen may contain deadline information.

The recommendation information creating section 257 of the distribution server 101 sends the recommendation information created as mentioned above to the server side wireless communication section 258 and the recommendation information is sent from the server side wireless communication section 258 to the mobile device 100 (M502). Recommendation information acquisition at Step S304 is performed as mentioned above.

Then, at Step S305, the received recommendation information is displayed on the display section 202 of the mobile device 100. The recommendation information process S300 is performed as described above.

Figure 7:
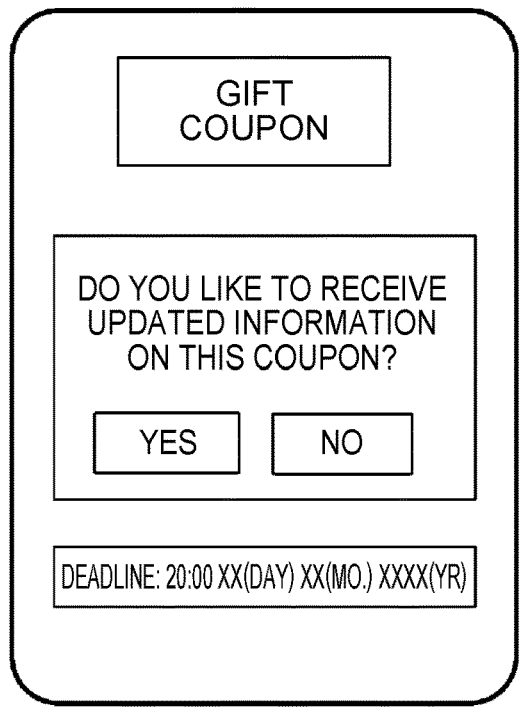
FIG. 7 shows an example of the screen for selecting updating of recommendation information according to the first embodiment of the present invention.

As mentioned above, the recommendation information process S300 is performed at predetermined regular intervals to give information to the user repeatedly and increase the advertising effectiveness. Meanwhile, some users may feel it undesirable that such recommendation information appears frequently and repeatedly. For this reason, when the recommendation information is displayed, a display record may be stored in the storage section 201 so that if it has been already displayed, the recommendation information process S300 is not performed. Or the predetermined time interval may be further lengthened. Or as shown in FIG. 7, a screen which urges the user to decide whether the recommendation information should be displayed from now on repeatedly may be presented to the user. In the case of this figure, the user chooses "YES" or "NO" through the operation section 203. If the user chooses "NO", the mobile side control section 211 no longer performs the recommendation information process S300. If the user chooses "YES", the latest recommendation information may be acquired and displayed according to the above recommendation information process S300. Also, the deadline may be updated or extended according to the time of acquisition of the latest recommendation information.

Figure 9:
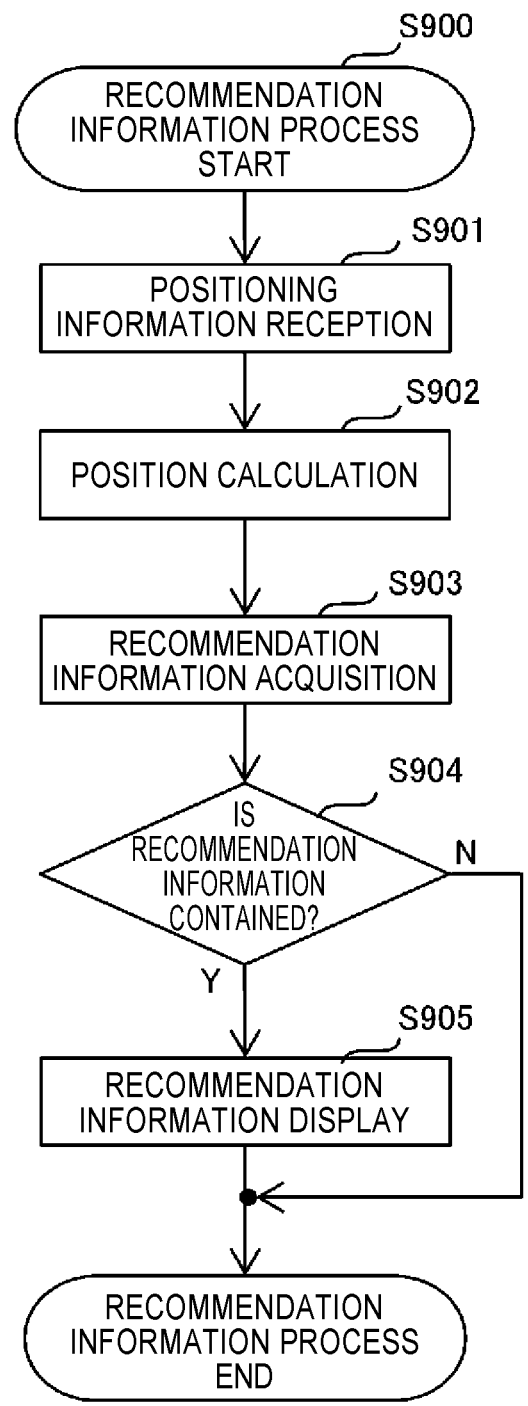
FIG. 9 is a flowchart of a second example of the recommendation information process according to the first embodiment of the present invention.

As for the above recommendation information process S300, the mode in which decision about presence in the distribution area is made in the mobile device 100 has been described. However, instead the process of decision about presence in the distribution area (S303) may be performed in the distribution server 101. FIG. 9 shows the flow of the recommendation information process (S900) in this mode. In this figure, reception of positioning information (S901) and position calculation (S902) are the same as S301 and S302 described in FIG. 3, respectively.

Figure 8:
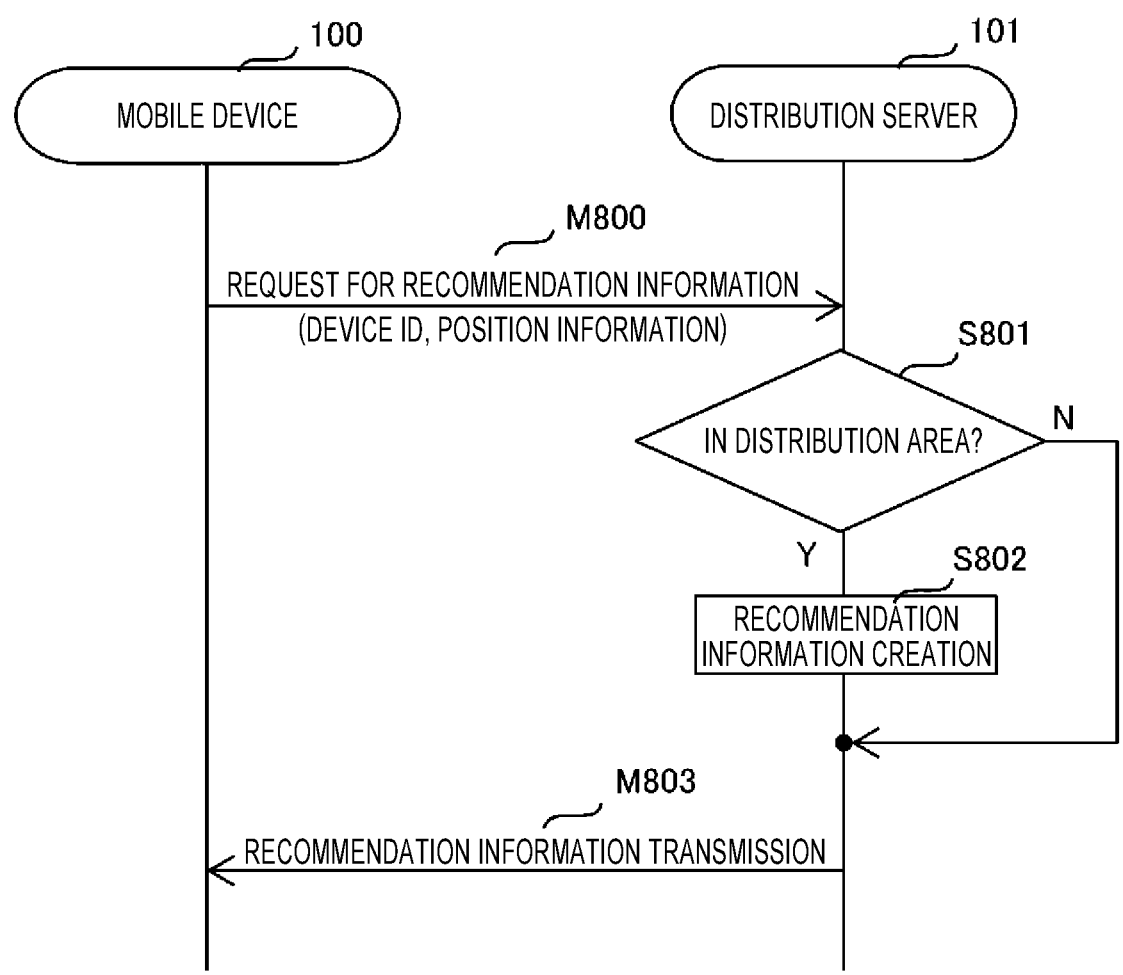
FIG. 8 shows the flow of a second example of communication in recommendation information acquisition according to the first embodiment of the present invention.

FIG. 8 shows the flow of communication between the mobile device 100 and the distribution server 101 in recommendation information acquisition (S903). The mobile device 100 sends a recommendation information request message (M800) containing the position information acquired at Step S302, to the distribution server 101. The distribution server 101 holds the distribution area information 400 shown in FIG. 4 and decides whether or not the mobile device 100 is present in the distribution area, according to the position information contained in the recommendation information request message M800 (S801). This decision method may be the same as the method described for Step S303. If at Step S801 it is decided to be in a distribution area, recommendation information suitable for the distribution area is created (S802). This process may be the same as the method described for Step S501. The created recommendation information is contained in a recommendation information transmission message (M803) and transmitted. If at Step S801 the mobile device 100 is decided to be not present in any distribution area, the recommendation information transmission message (M803) containing information that the mobile device 100 is outside the distribution area may be transmitted.

At Step S904, if the recommendation information transmission message (M803) contains recommendation information, the recommendation information appears on the display section 202 of the mobile device 100 in the same way as at Step S305 (S905). If the recommendation information transmission message (M803) does not contain recommendation information, namely when the mobile device 100 is not present in any distribution area, nothing may appear. The recommendation information process 900 in the case that the distribution area deciding process is performed in the distribution server 101 can be performed as described above.

(Right Information Process)

The right information management section 206 in the mobile side control section 211 performs the right information process (Step S1000) shown in FIG. 10 at regular time intervals. This time interval may be previously stored in the storage section 201 or a fixed value may be predetermined in the program which implements the right information management section 206. The right information process (Step S1000) may be performed alternately or concurrently with the above recommendation information process S300 or S900.

In the local communication area deciding process (S1001), decision is made about whether or not the mobile device 100 is present in the local communication area 103. The local communication area 103 is an area where communication with the local communication device 102 can be made. Local wireless communication with the local communication device 102 is made by the local wireless communication section 210 of the mobile device 100. As already stated, in this embodiment, an explanation is given mainly of the case that local wireless communication is BLE, but the present invention can be applied to any other local wireless communication. As mentioned above, the local wireless communication section 210 can receive a beacon signal transmitted by the local communication device 102 if in the local communication area 103. It may be decided that if this beacon signal can be received, the mobile device 100 is in the local communication area 103 and if the beacon signal cannot be received, it is outside the local communication area 103. Furthermore, by using the received signal strength (RSSI) value of Bluetooth (registered trademark) acquired by the local wireless communication section 210, the local communication area 103 can be set as a narrower area than the area where communication with the local communication device 102 can be made. Specifically, if the value is higher than a predetermined RSSI value threshold, the mobile device 100 may be decided to be in the local communication area 103.

At Step S1002, if the mobile device 100 is not decided to be present in the local communication area 103, the mobile side control section 211 ends the right information process (Step S1000). At Step S1002, if it is decided to be present in the local communication area 103, the mobile side control section 211 acquires right information (S1003).

Figure 11:
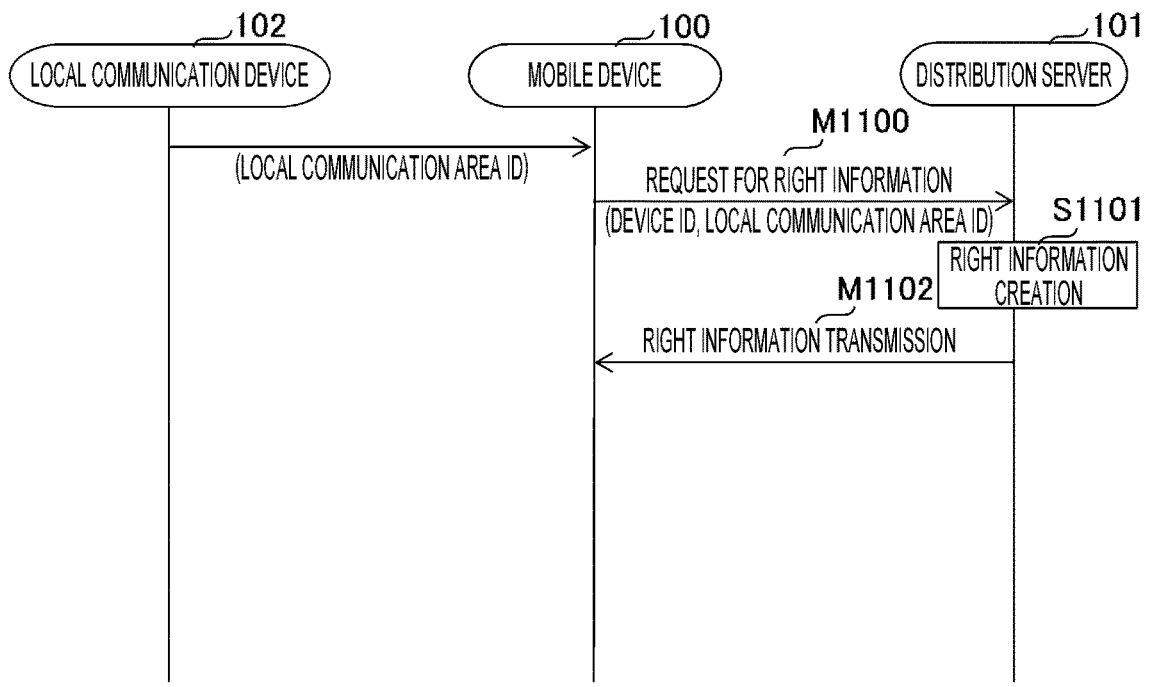
FIG. 11 shows the flow of communication in right information acquisition according to the first embodiment of the present invention.

FIG. 11 shows the flow of communication between the mobile device 100 and the distribution server 101 in right information acquisition (S1003). This communication is made when communication via the internet 109 can be made between the mobile device 100 and the distribution server 101 through the mobile side wireless communication section 208. The right information management section 206 of the mobile device 100 sends a right information request message (M1100) to the distribution server 101 through the mobile side wireless communication section 208. The right information request message (M1100) contains a device ID and a local communication device ID. The device ID is identifying information to identify the mobile device 100 and may have the same content as described about the recommendation information request message (M500) in FIG. 5. The local communication area ID is an identifier corresponding to the local communication area 103 in which at Step S303 it is decided that the mobile device 100 is present. The local communication area ID may be a character string predetermined so as not to overlap between areas or an identifier to identify the local communication device 102 which has made local wireless communication for the above area decision. If local wireless communication is BLE, it may be the ID contained in the beacon signal transmitted by the local communication device 102. If local wireless communication is wireless LAN, SSID of AP or the like may be used. Or, the local communication area ID may be information transmitted through local wireless communication to the mobile device 100 as the ID previously allocated to each area.

As the server side wireless communication section 258 of the distribution server 101 receives the right information request message (M1100), the right information creating section 256 creates right information 107 (see FIG. 1) suitable for the device ID and local communication area ID contained in the right information request message (M1100) (S1101). The right information 107 is the right to receive the service associated with the local communication area ID for each device ID and contains the right information ID to identify individual right information and its deadline. The deadline may differ depending on the time of transmission of the local communication area ID and right information request message (M1100). The right information 107 may be a content including an image and characters or may be in the form of image data or in the form of a script language describing the content, such as HTML.

The distribution server 101 sends the created right information 107 as a right information transmission message (M1102) to the mobile device 100 through the server side wireless communication section 258. The acquisition of right information at Step S1000 is performed as mentioned above.

Figure 17:
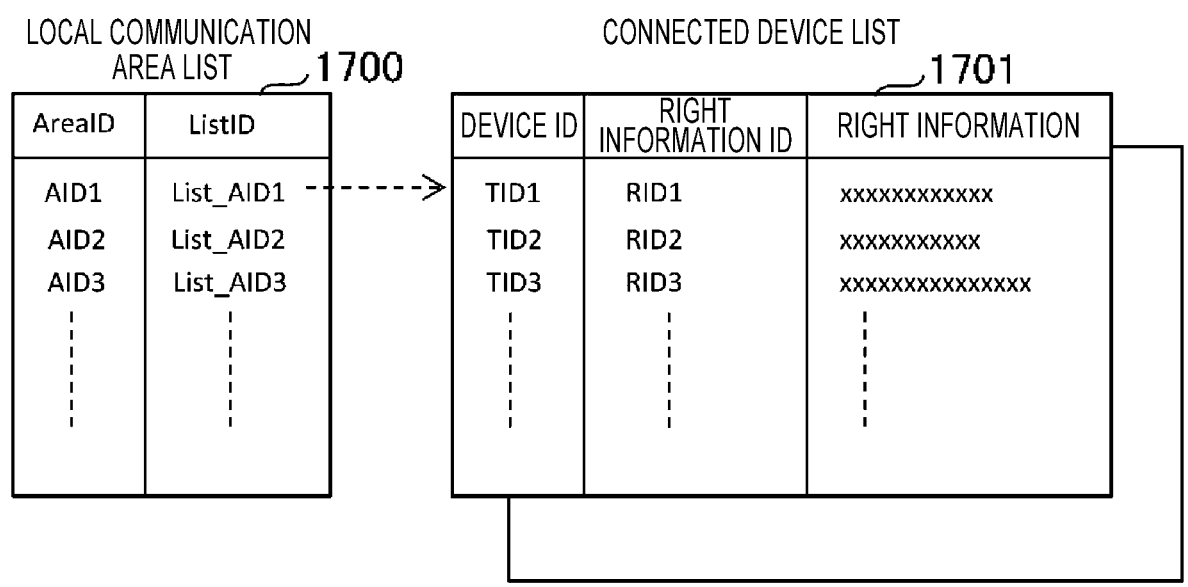
FIG. 17 is a conceptual diagram of the local communication area list and connected device information list according to the first embodiment of the present invention.

Furthermore, the distribution server 101 may create and store a local communication area list 1700 and an existing connected device list 1701 for each local communication area ID as shown in FIG. 17. These can be used for right information and device authentication when there is an access from a device, as will be described later.

As the mobile device 100 acquires the right information at Step S1003 in FIG. 10, the right information process is ended. After that, the distribution service process (S313) in FIG. 3 using the right information is performed.

Figure 16:
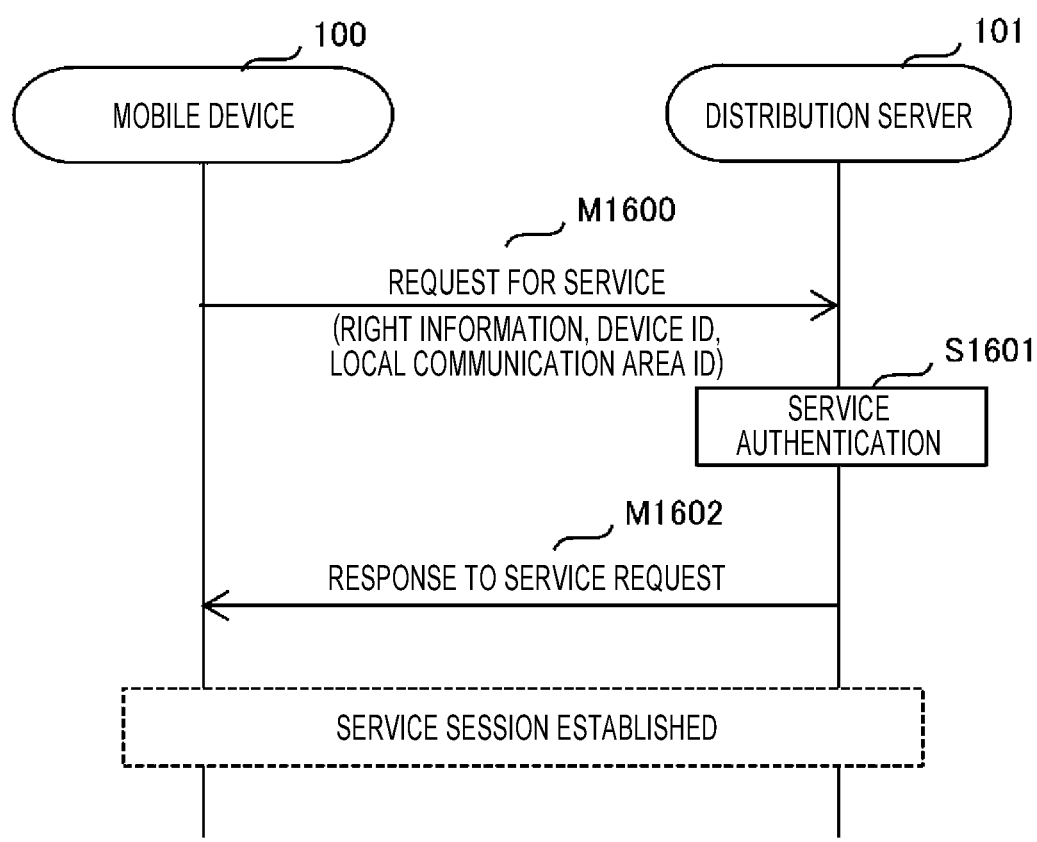
FIG. 16 shows the flow of communication in the service provision process according to the first embodiment of the present invention.

FIG. 16 shows the flow of communication between the mobile device 100 and the distribution server 101 in the service provision process (S104). This communication is made through the mobile side wireless communication section 208 and the server side wireless communication section 258.

The mobile device 100 sends a service request message (M1600) to the distribution server 101. The service request message (M1600) contains a device ID, a local communication area ID and right information. These are the same as the contents already described and the right information at least contains a right information ID to identify the right information and deadline information.

In the distribution server 101, as the service request message (M1600) is received, the service provision processing section 254 performs service authentication according to the service request message (M1600) (S1601). In service authentication (S1601), the local communication area ID and right information contained in the service request message (M1600) are authenticated. One example of the method for authenticating the local communication area ID is to check whether the local communication area ID in M1600 is included in the local communication area list 1700 as shown in FIG. 17. Desirably the local communication area list 1700 is stored in the distribution server 101 in advance. As the method for authenticating the right information, not only the deadline but also whether or not the right information ID violates the predetermined naming rules are checked. Also, the distribution server 101 may create a connected device list 1701 as shown in FIG. 17 for each local communication area ID on the distribution server 101 and store it. The connected device list 1701 may be created at Step S1601 or created and stored at the time of creation of right information in FIG. 11 (S1101) as mentioned above. If the connected device list 1701 is created at Step S1101, the validity of the right information may be confirmed by checking the right information ID in the right information request message M1600 against the connected device list 1701.

If the right information is confirmed as valid, the service request response message (M1602) notifies of it. Or, service information, for example, a coupon is sent back as a service request response message.

With the above procedure, for the mobile device 100, the right information 107 acquired in the local communication area 103 is authenticated by the distribution server 101 and a service session is established. From this time, the distribution server can distribute a content as some privilege only to the authenticated device ID in each local communication area. Consequently, the user can enjoy a content as a privileged service while staying in the local communication area 103. Therefore, the user may stay around a target place for a long time, so that improvement in purchase opportunities in the neighboring area can be expected.

(Example of Coincidence Between Right Information and Service Content)

The above explanation has been given of the case that the right information 107 is different from the service content distributed using it, as an example. Meanwhile, if the information sent as the right information 107 coincides with the service content, the distribution service process at Step S1500 and the right information acquisition process can be performed simultaneously. This mode is explained below, taking distribution of coupon information for discount sale for example.

Figure 10B:
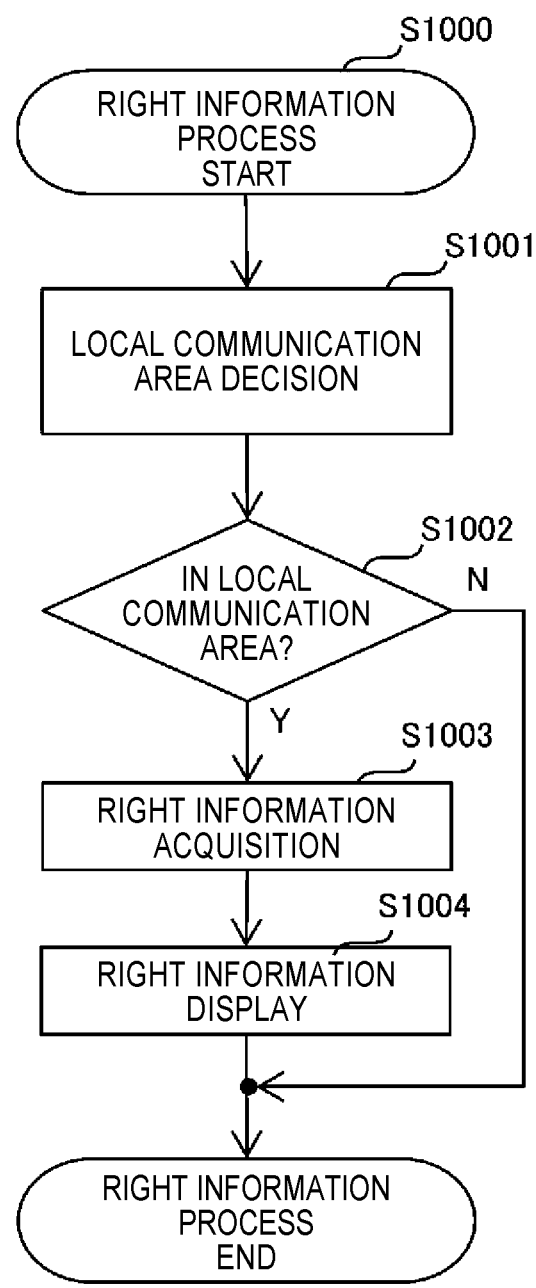
FIG. 10B is a flowchart of a second example of the right information process according to the first embodiment of the present invention.

In the right information acquisition process (S1003) in FIG. 10B, the right information creating section 256 of the distribution server 101 acquires image information for a coupon image (FIG. 12) from the service provision processing section 254 and creates a right information transmission message (M1102) containing the image information. In this case, the right information transmission message (M1002) also functions as a service request response message (M1602).

The right information management section 206 of the mobile device 100 gives the right information transmission message (M1102) to the service processing section 204 and the service processing section 204 performs the process to display the coupon image on the display section 202. Consequently, the right information which is also service information is displayed (S1004).

Figure 12:
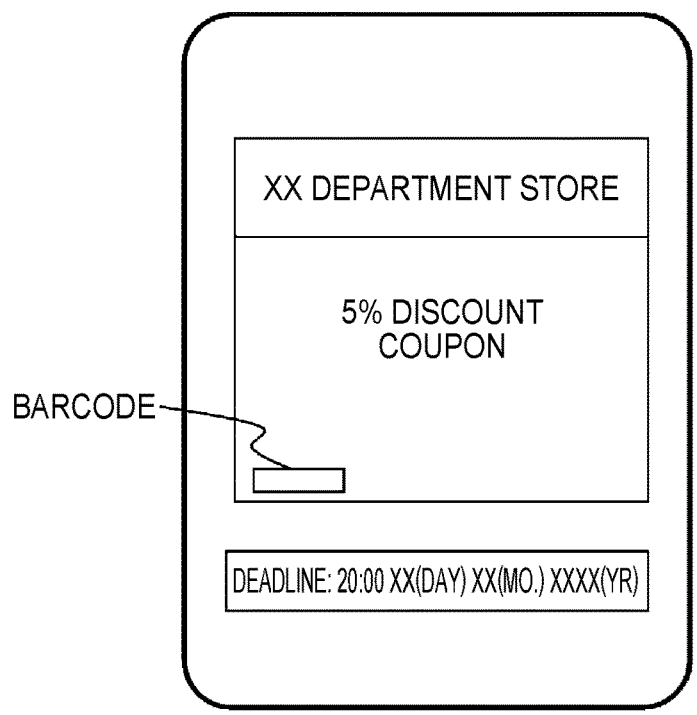
FIG. 12 shows an example of the right information screen according to the first embodiment of the present invention.

FIG. 12 shows an example of the right information screen which also functions as service information. The information displayed on the right information screen is information for use of the service provided in the local communication area 103. As shown in the figure, a barcode or the like may be used so that the user can enjoy the service through a store's barcode reader or shows a store employee the screen in FIG. 12.

In this example, the right information which is also service information is displayed on the screen, but the right information is information required to acquire the service information and need not always appear on the display section 202. For example, as will be described later, if the acquired right information ID is used to authenticate some communication service, only transmission of the right information ID to the authenticating side is required for authentication and thus it need not be in the form of an image but may be character string information to notify the user of acquisition of the right information.

The above right information process (Step S1000) suggests a case that the process is performed regardless of existence/non-existence of recommendation information 106 and its deadline. In other words, in the above example, the right information 107 can be acquired even if the recommendation information 106 is not received or the validity period of the recommendation information 106 expires. However, in some cases, depending on the service type or customer attracting policy, restrictions should be imposed so that the right information can be acquired only before the deadline of the recommendation information 106. For example, a possible approach is to post a target advertisement in the recommendation information 106 and allow only the user who has browsed the advertisement, to acquire the right information 107.

(Acquisition of Right Information Only Before Deadline)

Figure 13A:
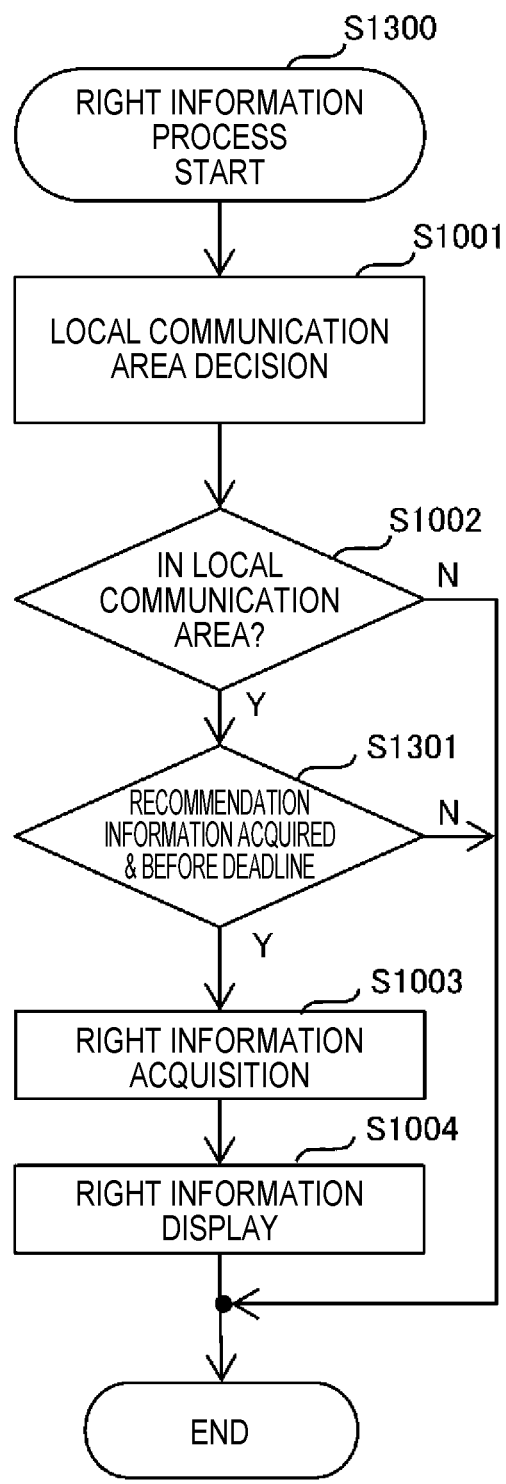
FIG. 13A is a flowchart of a third example of the right information process according to the first embodiment of the present invention.
Figure 13B:
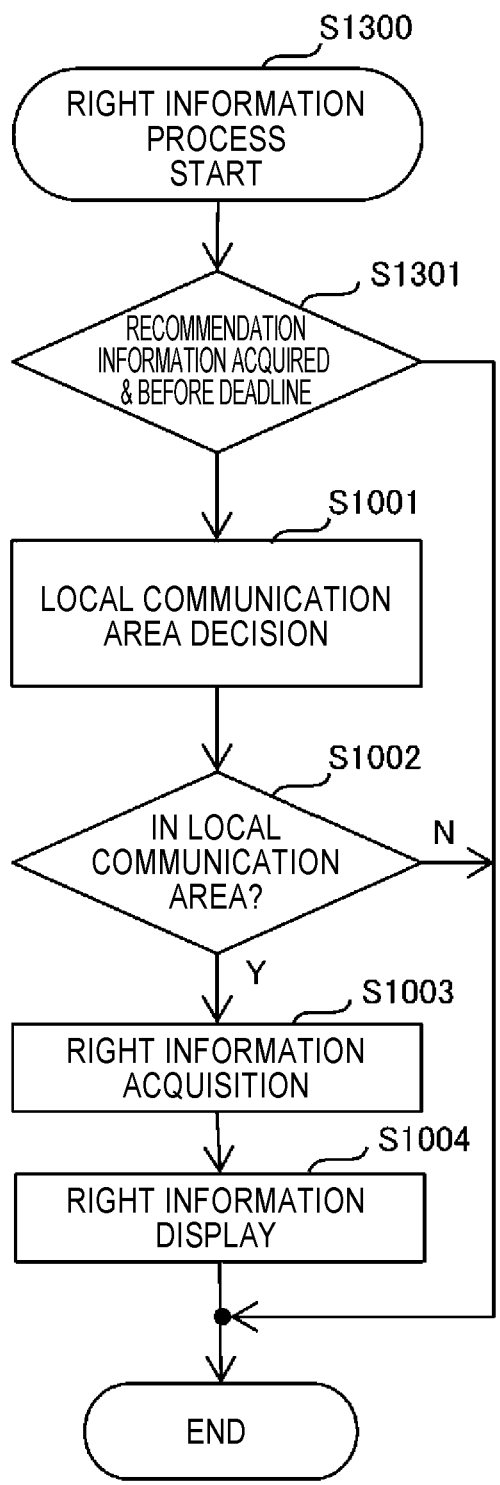
FIG. 13B is a flowchart of a fourth example of the right information process according to the first embodiment of the present invention.

FIG. 13A and FIG. 13B show two examples of the right information process S1300 in the case that the right information is acquired only before the deadline of the recommendation information 106. These figures show the right information process (Step S1000) in FIG. 10A or FIG. 10B plus the flow of Step S1301 in which decision is made as to whether or not the recommendation information has been acquired and it is before the deadline of the recommendation information, and only when this condition is satisfied, the right information is acquired. In the example of FIG. 13A, the decision at Step S1301 is added just before the right information acquisition process (Step S1003). In the example of FIG. 13B, the decision at Step S1301 is added just before the local communication area decision process S1001. The other processes are the same as the steps described above in FIG. 10. As mentioned above, if the recommendation information has not been acquired yet or the validity period of the recommendation information expires, the right information 107 is not acquired until the recommendation information 106 is acquired again by the recommendation information process S900 which is performed at regular time intervals concurrently with the right information process (Step S1003).

(Updating of the Right Deadline)

As explained above, according to the present invention, the user is induced to enter the local communication area by sending the user the right information to receive the service which may be an incentive. In addition, the recommendation information to notify the user of the service is transmitted in the distribution area.

In the present invention, in order to encourage the user to stay in the local communication area for a long time, the deadline of the acquired right information is updated at regular intervals while the mobile device 100 is present in the local communication area. This time interval may be stored in the storage section 201 or may be a fixed value which is predetermined in the program implementing the right information management section 206.

Figure 14:
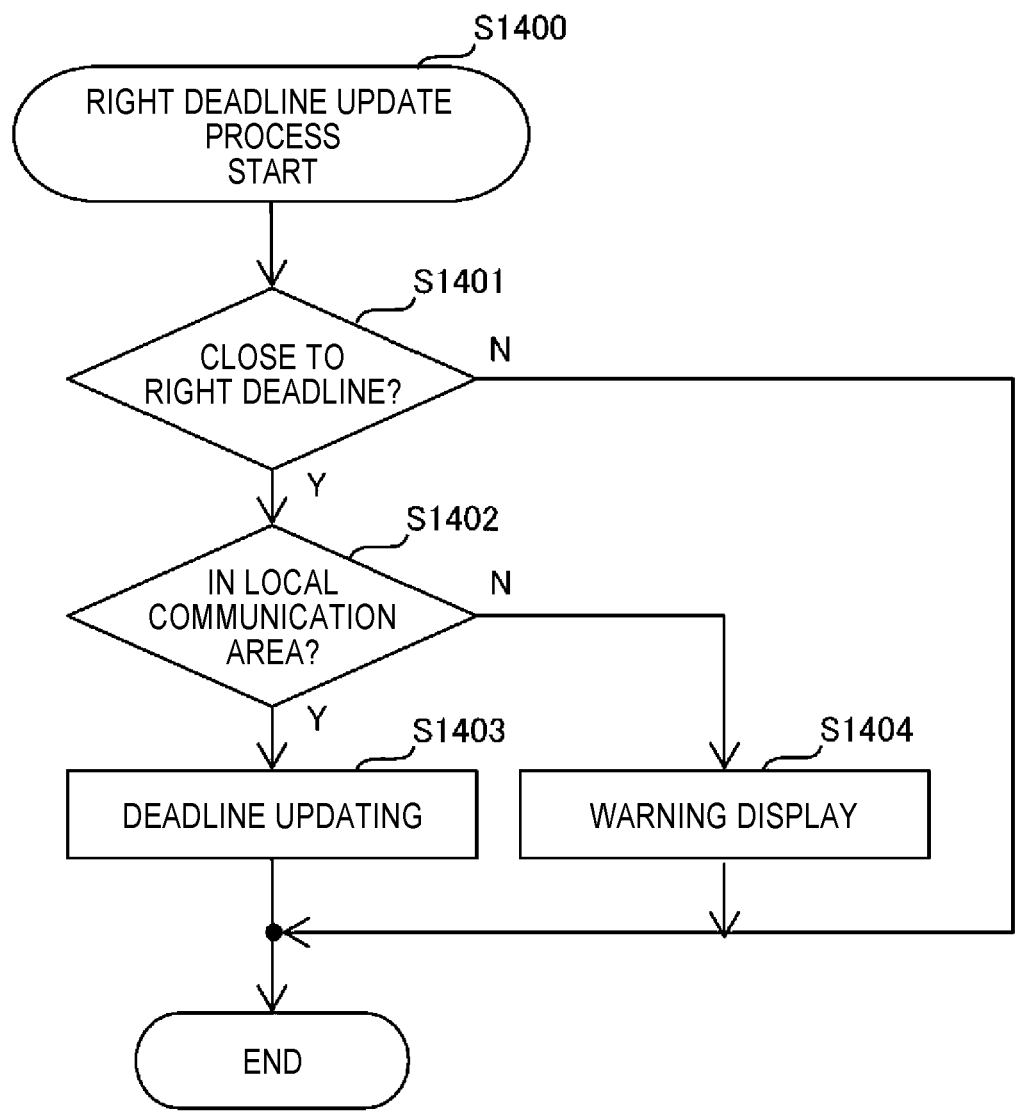
FIG. 14 is a flowchart of the right deadline updating process according to the first embodiment of the present invention.

FIG. 14 shows the flow of the right deadline updating process S1400. The right information management section 206 of the mobile device 100 decides whether or not the current time is close to the deadline of the right information (S1401). One example of this decision method is to calculate the remaining time until the deadline of the right information and if the remaining time is not more than a predetermined threshold, decide that the deadline is near and if it is larger than the threshold, decide that the deadline is not near. This threshold may be previously stored in the storage section 201 or may be a fixed value which is predetermined in the program implementing the right information management section 206. If it is decided at Step S1401 that the deadline of the right information is not near, the right deadline updating process S1400 is ended.

If it is decided at Step S1401 that the deadline of the right information is near, decision is made as to whether or not the mobile device 100 is in the local communication area 103 (S1402). This decision process may be the same as the local communication area decision process (S1001) in FIG. 10.

Figure 19A:
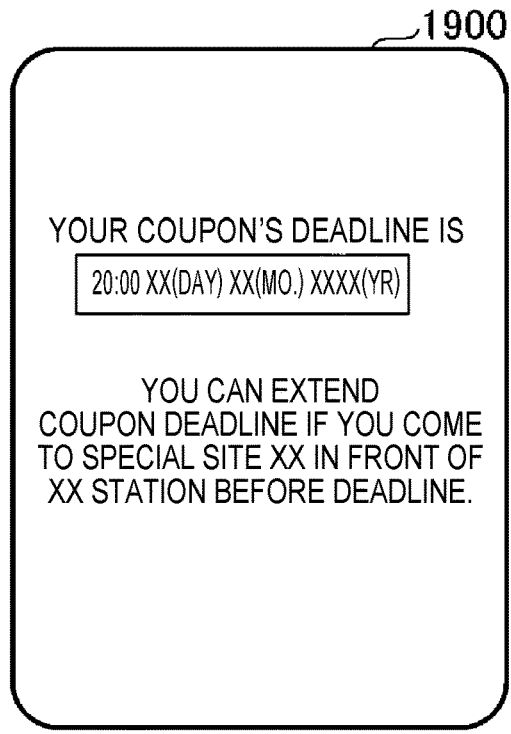
FIG. 19A shows an example of the recommendation information display screen outside the area according to the first embodiment of the present invention.

If it is decided at Step S1402 that the mobile device 100 is outside the local communication area 103, a warning may be displayed (S1404). FIG. 19A shows an example of the warning display. Like the screen (1900), a warning to notify that the deadline can be updated in the local communication area 103 may be given to encourage the user to stay at the target place longer.

If it is decided at Step S1402 that the mobile device 100 is in the local communication area 103, the right information management section 206 performs the deadline updating process (S1403). The deadline updating process (S1403) updates the deadline given at the time of acquisition of the right information 107. This updating process may be performed by adding a predetermined extra time to the deadline before updating or adding a predetermined period of validity to the current time. As described in FIG. 17, if the right information for each device is stored in the distribution server 101, a request to update the deadline information contained in the right information may be issued to the distribution server 101 so that the distribution server 101 updates it.

As mentioned above, in the right deadline updating process S1400, the deadline of the right information is automatically updated while the mobile device 100 is in the local communication area 103, so an incentive can be given to encourage the user to stay in the local communication area for a long time.

(Distribution Service with Authentication by Right Information)

The right information screen shown in FIG. 12 shows an example that the coupon itself shown as an image content is right information and the place of right is used in a manner to be presented at the store. In addition to this, the right information may be used in such a way that the right information is used for authentication in the distribution server 101 and a certain content distribution service is provided only to the device of the user who acquires the right information.

Figure 15:
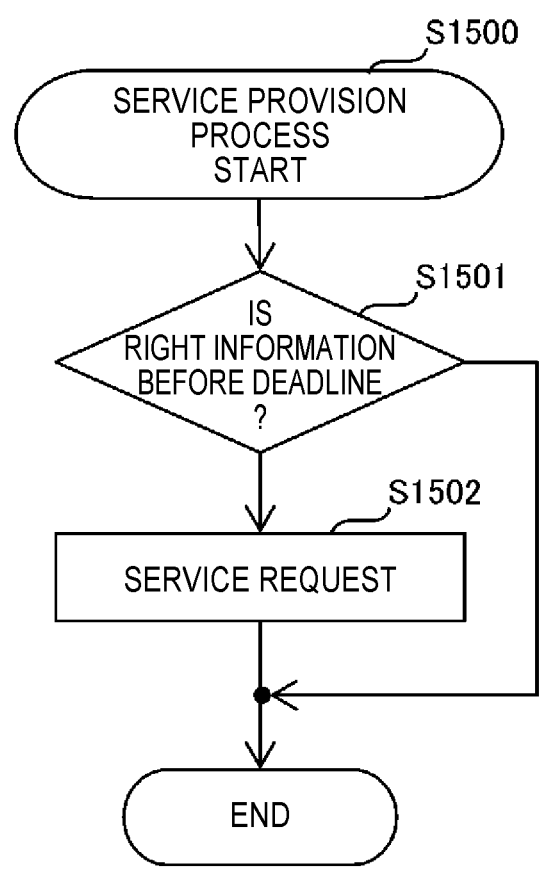
FIG. 15 is a flowchart of the service provision process with right information authentication according to the first embodiment of the present invention.

FIG. 15 shows the flow of the service provision process with authentication by right information (Step S1500). This flow is performed in the service processing section 204 of the mobile device 100. The service provision process (Step S1500) is started by access to the distribution server 101. The information on the access destination may be stored, for example, in the right information 107 in the URL form. The access may be started when the user expressly does access operation using the operation section 203 or may be automatically started after acquisition of the right information 107.

The service processing section 204 decides whether or not the acquired right information 107 is before the deadline (S1501). If the right information 107 is decided to be not before the deadline, the service processing section 204 ends the service provision process (Step S1500). If the right information 107 is decided to be before the deadline, the service request process (Step S1502) is performed. In the service request information process (S1502), the abovementioned process in FIG. 16 is performed.

(Recommendation Information Display Outside the Area)

In the present invention, when it is detected that the user is outside the local communication area or the distribution area, the recommendation information is displayed again.

Figure 18:
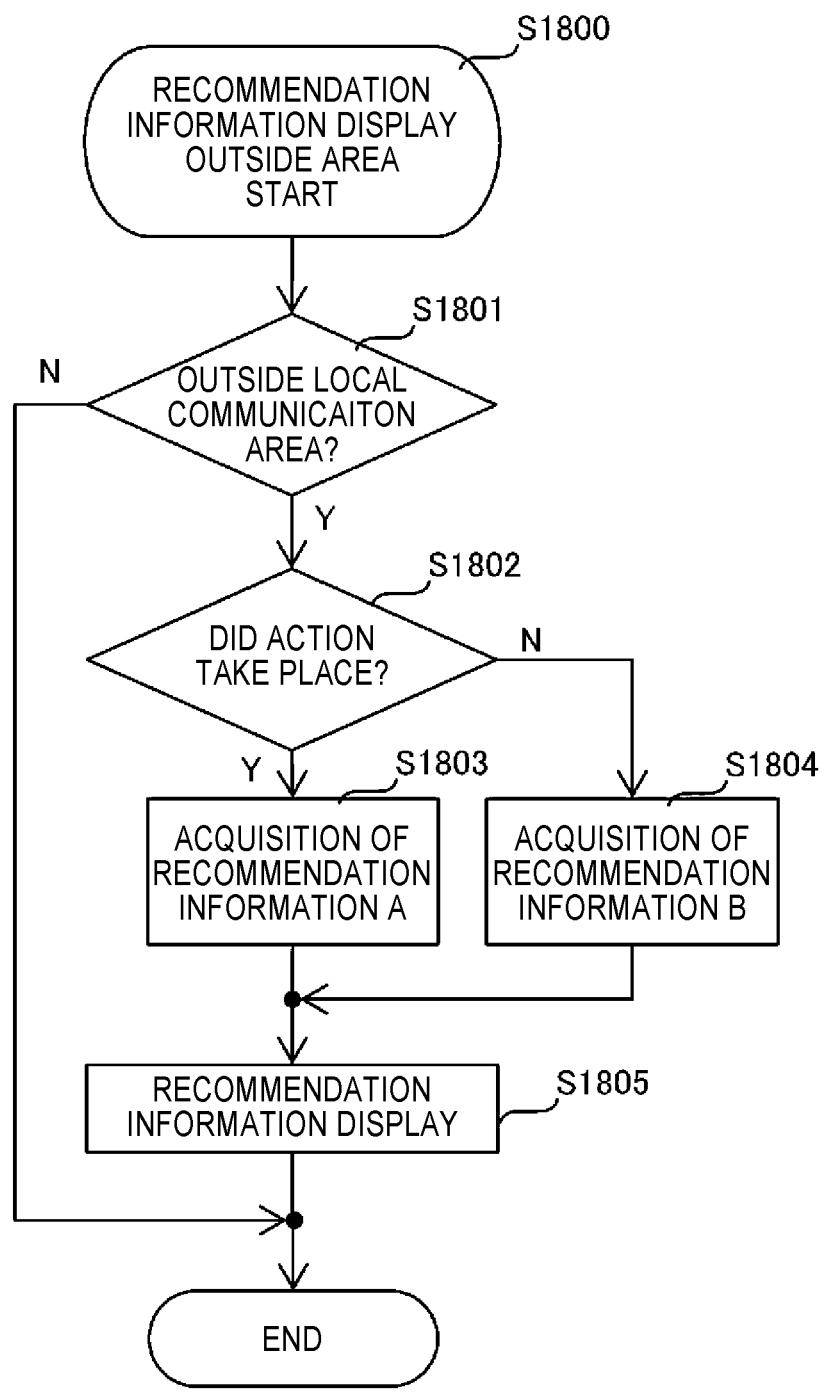
FIG. 18 is a flowchart of the recommendation information display outside the area according to the first embodiment of the present invention.

FIG. 18 shows the flow of recommendation information display outside the local communication area 103 (S1800). The recommendation information management section 207 decides whether or not the mobile device 100 is outside the local communication area (S1801). As one example of the process at Step S1801, decision is first made as to whether or not the mobile device 100 is in the local communication area 103. This decision process may be the same as the local communication area decision process (S1001) in FIG. 10.

Next, if the mobile device 100 is outside the local communication area 103 and the latest decision was that it is in the local communication area 103, it may be detected that the mobile device 100 has moved out of the local communication area 103. If at Step S1801 it is decided that the mobile device 100 has not moved out of the local communication area 103, the recommendation information display process (S1800) is ended.

If at Step S1801 it is decided that the mobile device 100 has moved out of the local communication area, the recommendation information management section 207 decides whether or not a given action has taken place on the mobile device 100 (Step S1802). Here, the given action includes acquisition of the right information 107 (S1003), display of the right information (S1004) or provision of distribution service (S1500). These actions may be freely defined by the user according to the content of the action which the distribution service provider expects.

Next, the recommendation information management section 207 performs the recommendation information acquisition process depending on whether or not the above action has taken place (S1803, S1804). The recommendation information acquisition process may be performed in the same way as the flow of communication between the mobile device 100 and the distribution server 101 as shown in FIG. 5. However, the recommendation information request message M500 must contain information about the existence/non-existence of the action. Also, the ID of the last local communication area in which the mobile device 100 stayed may be specified instead of the distribution area ID contained in the recommendation information request message M500. The distribution server 101 creates the content of recommendation information according to the information about the existence/non-existence of the above action and the local communication area ID (S501) and sends it to the mobile device 100 (M502).

Figure 19B:
FIG. 19B shows an example of the recommendation information display screen outside the area according to the first embodiment of the present invention.
Figure 19C:
FIG. 19C shows an example of the recommendation information display screen outside the area according to the first embodiment of the present invention.

FIG. 19B shows an example of recommendation information A (1901) when a given action has taken place and FIG. 19C shows an example of recommendation information B (1902) when a given action has not taken place. In the example in FIG. 19B, the given action is acquisition of a coupon as right information. The recommendation information A may be a content which expresses thanks for the fact that the coupon has already been acquired. If the right information is still valid, its validity may be written in the recommendation information A to encourage shopping again.

Meanwhile, the recommendation information B in FIG. 19C may again give the coupon information to the user who has not acquired the coupon as right information yet, and display a content which urges the user to acquire the right information. If the number of persons allowed to acquire the right is limited, real time information such as the number of remaining persons, for example, "21 remaining persons," may be presented to increase the buying motivation.

In the example described in FIG. 18, at Step S1801 decision is made as to whether or not the mobile device 100 is outside the local communication area 103. However, the area decision at Step S1801 may be replaced by the decision as to whether or not it is outside the distribution area 104. Or, decision as to whether or not it is outside the local communication area 103 and decision as to whether or not it is outside the distribution area 104 may be both made so that the mobile device 100 displays the recommendation information content which depends on each detection result.

When the recommendation information which differs depending on whether or not the right information is acquired is displayed in this way, publicity with higher advertising effectiveness can be made without presenting unrequired recommendation information to the user.

(System Configuration which Transmits Right Information from the Local Communication Device)

In the above example, in the right information acquisition process (S1003), the mobile device 100 requests the distribution server 101 right information and the right information created in the distribution server 101 (S1101) is sent to the mobile device 100.

However, this right information may be transmitted from each local communication device 102 through local wireless communication. For example, the beacon signal emitted from the local communication device 102 may contain information such as a right information ID. Or the beacon signal may contain access information such as URL to acquire right information so that access to it can be made through local wireless communication to acquire the right information.

(Selection of Service Information)

Figure 20:
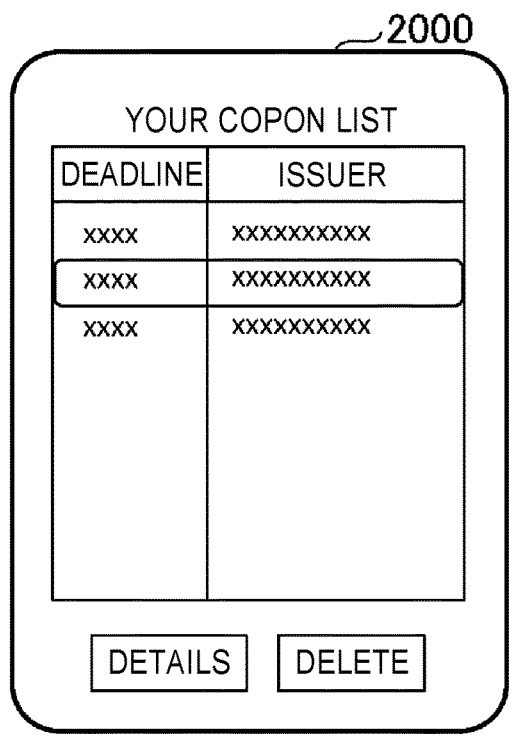
FIG. 20 shows an example of the service information list screen according to the first embodiment of the present invention.

If a plurality of types of service information are available as mentioned above, the user may select from the plural types of service information on the mobile device and use the service information. One example may be that as shown in FIG. 20 a service information list is presented to the user to enable the user to select one from it and thereby issue the above distribution service request using the service information. In addition, the unrequired service information may be deletable from the above list. This service information list may be created by the service processing section 204 and the unrequired service information may be deleted from the list according to editing operation by the user.

As described so far, in the first embodiment according to the present invention, right information to receive service only in the target area can be received and recommendation information to notify of the service can be sent to users present in a wider area than it. Consequently, it can be expected that the user stays longer around the target place and the business opportunity for businesses around the target place and content distributors is increased.

(2) Second Embodiment (System Configuration Including a Linked Device)

Figure 21:
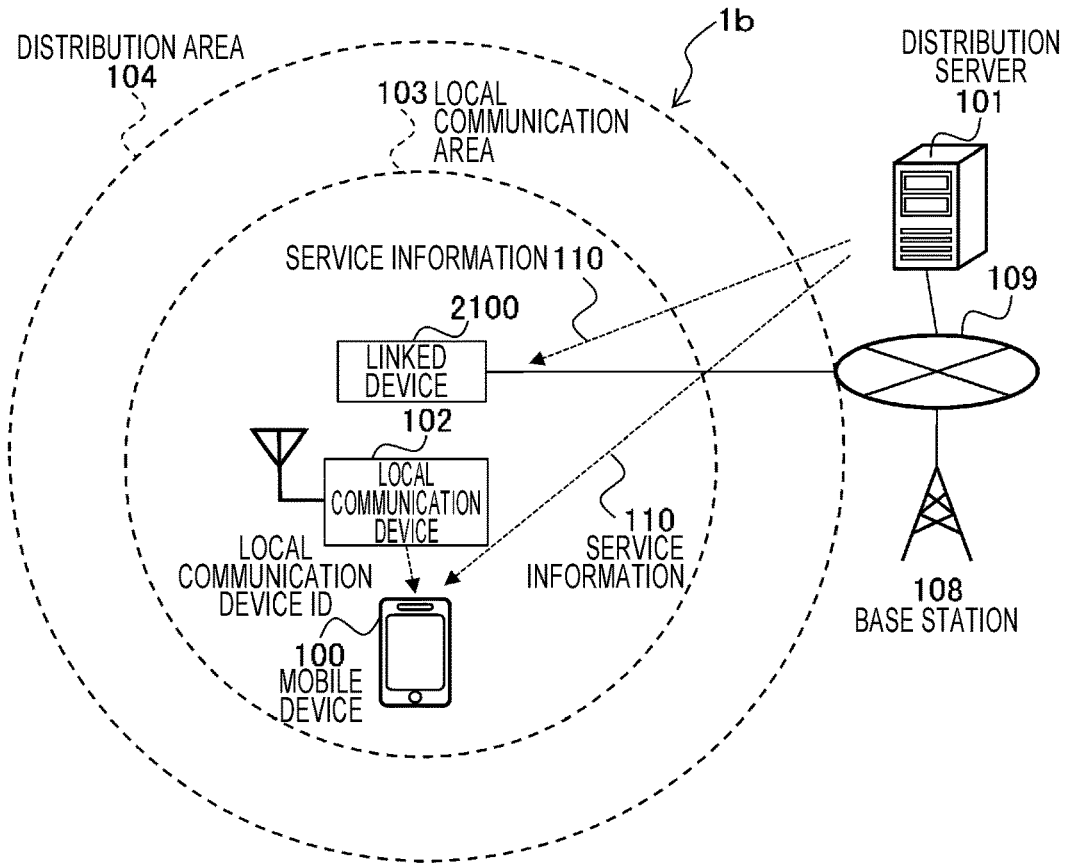
FIG. 21 shows the configuration of the mobile device link system according to a second embodiment of the present invention.

FIG. 21 is a diagram which shows an example of the configuration of a mobile device link system 1b according to the second embodiment of the present invention. The mobile device link system 1b shown in the figure includes, in addition to the configuration of a mobile device link system 1a as the first embodiment shown in FIG. 1, a linked device 2100 capable of communicating with the distribution server 101. The present invention shows an example that the linked device 2100 includes a linked device side communication section (not shown) and is connectable via the internet 109; however, it is not limited to this and it may be a mobile phone network, wide-area wireless communication network or the like. In order to make the explanation easy to understand, it is assumed in the present invention that the linked device 2100 is at a short distance from the local communication device 102, but it is not limited to this and it need not be in the local communication area 103.

Figure 22A:
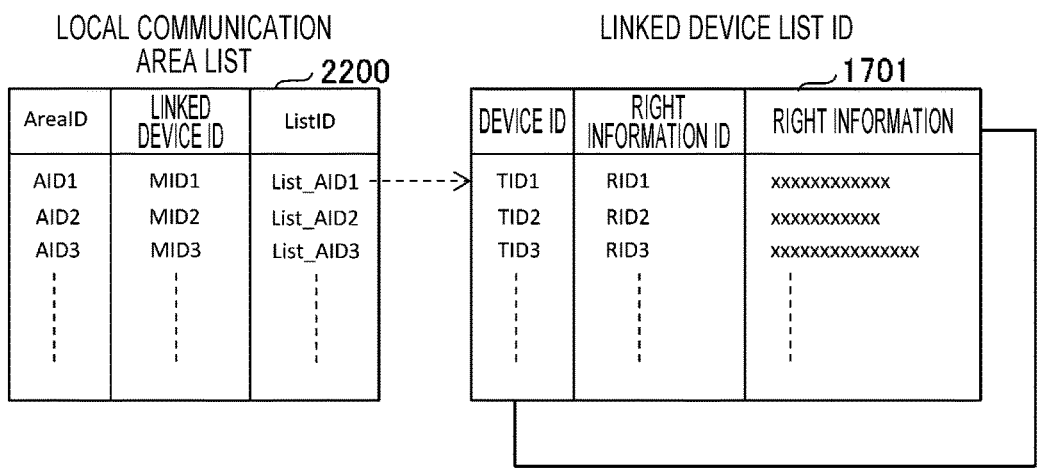
FIG. 22A is a conceptual diagram of the local communication area list and connected device information list according to the second embodiment of the present invention.
Figure 22B:
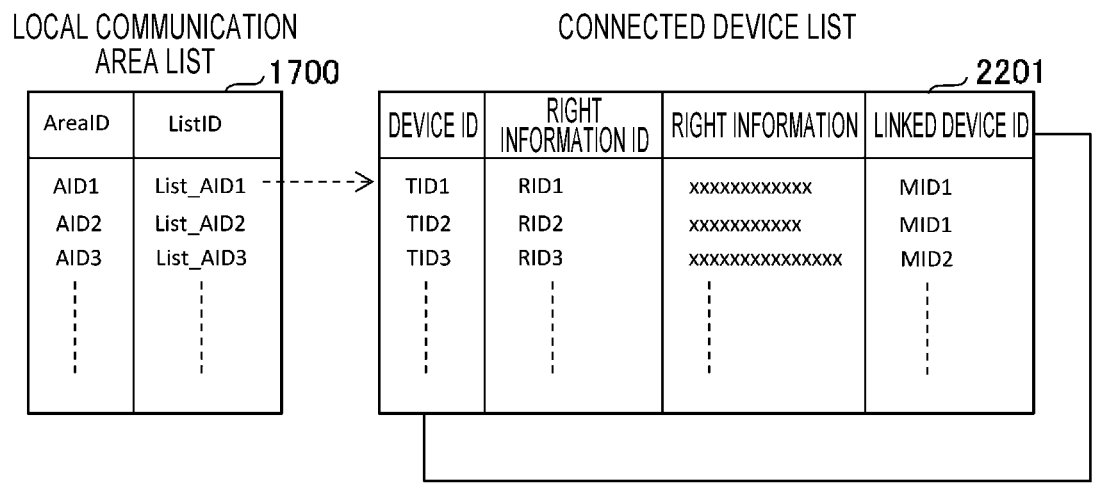
FIG. 22B is a conceptual diagram of the local communication area list and connected device information list according to the second embodiment of the present invention.

The linked device 2100 is associated with the mobile device 100 in the local communication area 103 by the distribution server 101. FIG. 22A and FIG. 22B show examples of table information for this association in the distribution server 101.

FIG. 22A shows an example of a local communication area list 2200. The local communication area list 2200 includes not only the local communication area list in the first embodiment but also the linked device ID information for each local communication area. The linked device ID is information to identify and communicate with each linked device 2100 and must be uniquely associated at least with the communication destination address of the linked device 2100. In the example in FIG. 22A, one linked device ID is set for each local communication area. Therefore, all mobile devices present in each local communication area are associated with the linked device ID in each area.

In the example in FIG. 22B, in a connected device list 2201 for each local communication area, each mobile device is associated with a linked device ID. In the case of this example, regarding association between a linked device ID and a mobile device, a plurality of linked devices are present in the same local communication area 103 and they are allocated and associated to mobile devices. For example, even in the same local communication area, the linked devices may be arbitrarily allocated for load distribution. If user profile information can be acquired at the time of acquisition of right information, the linked devices may be allocated according to the user profile (by sex or age, etc.). This connected device list 2201 may be created at the time of service authentication at Step S1601 described in FIG. 16 or may be created and stored at the time of creation of right information in FIG. 11 (S1101).

When the linked device 2100 is associated with a plurality of mobile devices 100 located near it as mentioned above, the linked device can perform a given process according to operation of a mobile device and its result can be reflected in another mobile device. For example, the following function can be realized: the linked device is a display device like a large monitor and only the several mobile devices that have acquired right information near the display device can do picture drawing on the display device.

Figure 23:
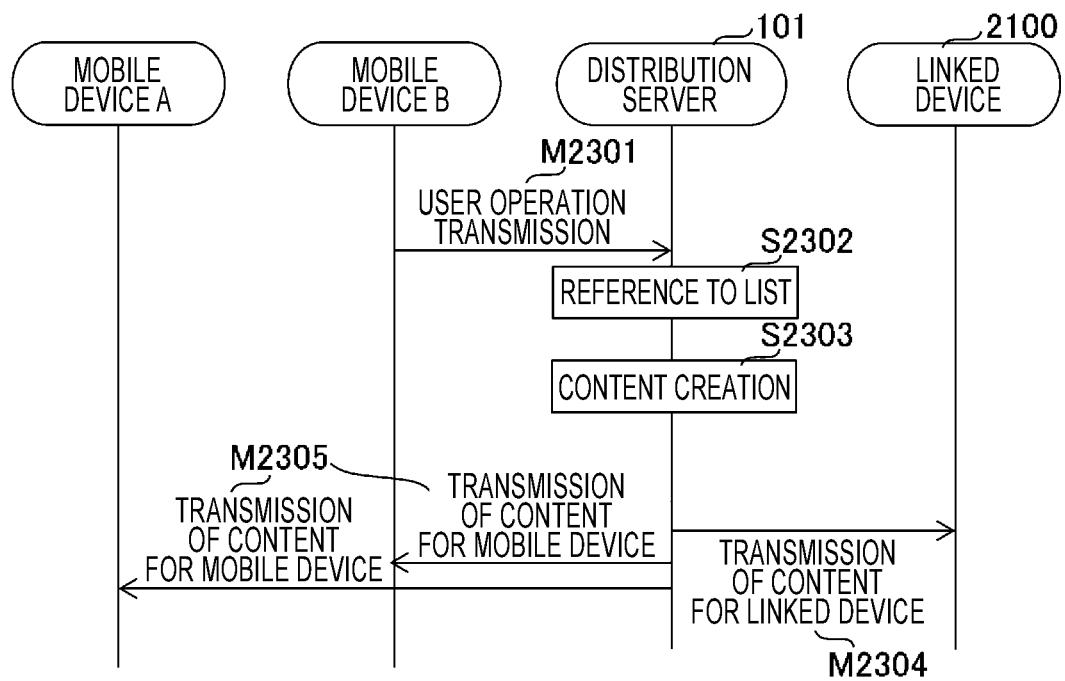
FIG. 23 shows the flow of communication in the mobile device link system according to the second embodiment of the present invention.

FIG. 23 shows the flow of processing among the distribution server 101, linked device 2100 and mobile devices A and B associated with the linked device 2100. Although not indicated for the convenience of explanation in FIG. 23, it is assumed that each of the mobile devices A and B has finished the application start (S101), recommendation information process (S102), and right information process (S103) as mentioned above in FIG. 1A and performs the picture drawing process as the service provision process (S104). Here, in the recommendation information process S102, for example, the distribution area 104 may be set around the station nearest to the place where the linked device 2100 is installed and the message "Picture drawing on a large monitor will start from XX at XX Park" may be distributed as recommendation information.

In the right information process, when a user operation command for specifying the color and line for picture drawing is sent from each of the mobile devices A and B to the distribution server 101, by adding right information to the user operation command, the distribution server 101 performs authentication to check if the mobile device sending the user operation command is entitled to participation in picture drawing.

As shown in FIG. 23, the mobile device B sends some user operation transmission message (M2301) to the distribution server 101. In the case of the above example of picture drawing, this corresponds to a drawing command such as a line and circle. This message M2301 must at least contain the device ID of the mobile device and right information.

The distribution server 101 refers to the list in FIG. 22A or FIG. 22B to know which local communication area the device ID is connected to, which linked device 2100 it is associated with, and the IDs of the other mobile devices associated with the linked device 2100 (S2302).

The distribution server 101 creates a content for the linked device and a content for the mobile devices (S2303). In the above example of picture drawing, they correspond to the drawing result displayed on the large screen and the drawing result displayed on each mobile device, respectively.

The created content for the linked device is transmitted to the linked device 2100 (M2304) and the content for the mobile devices is transmitted to all the mobile devices linked to the linked device 2100 (mobile devices A and B in the figure) (M2305). However, the content may differ between the device having done user operation (mobile device B in FIG. 23) and the other mobile device(s) (mobile device A in the figure). Or the content need not always be transmitted to all the mobile devices and the mobile devices for transmission may be selected stochastically: for example, transmission is made only to randomly selected mobile devices. For simplification of the figure, only two mobile devices are shown but the flow of processing is the same as even when there are more devices.

As mentioned above, in the mobile device link system 1*b* in the second embodiment of the present invention, a given device and a plurality of mobile devices located near it are associated with each other through a distribution server, so a highly interactive content with the mobile devices linked to that device can be supplied only around the linked device. Therefore, the user attracting effect is expected to be increased.

A simple picture drawing example has been described above. Next, embodiments which provide a more entertaining content such as a game with many participants will be described.

(3) Third Embodiment (Competition Game on a Large Monitor)

The third embodiment of the present invention shows an example that a large monitor is taken as a linked device in the second embodiment and users around the monitor play a competition game. In short, the content of the service provision process (S104) is changed from picture drawing to a competition game. Therefore, the application start process (S101), recommendation information process (S102), and right information process (S103) are performed and right information is added to the game command sent from each of the mobile devices A and B to the distribution server, though the same details as in the second embodiment are not described.

Figure 24:
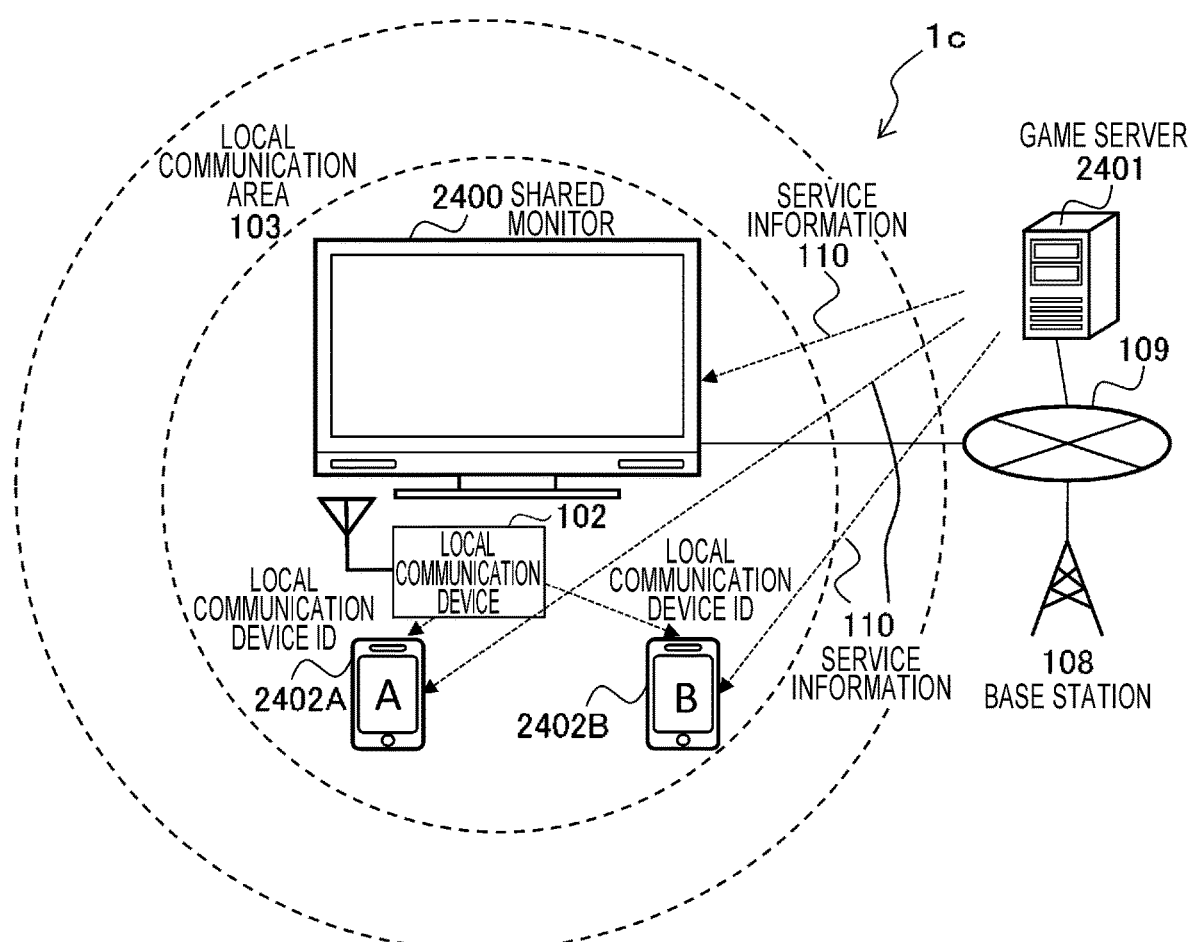
FIG. 24 shows the configuration of the mobile device link system according to a third embodiment of the present invention.
Figure 25:
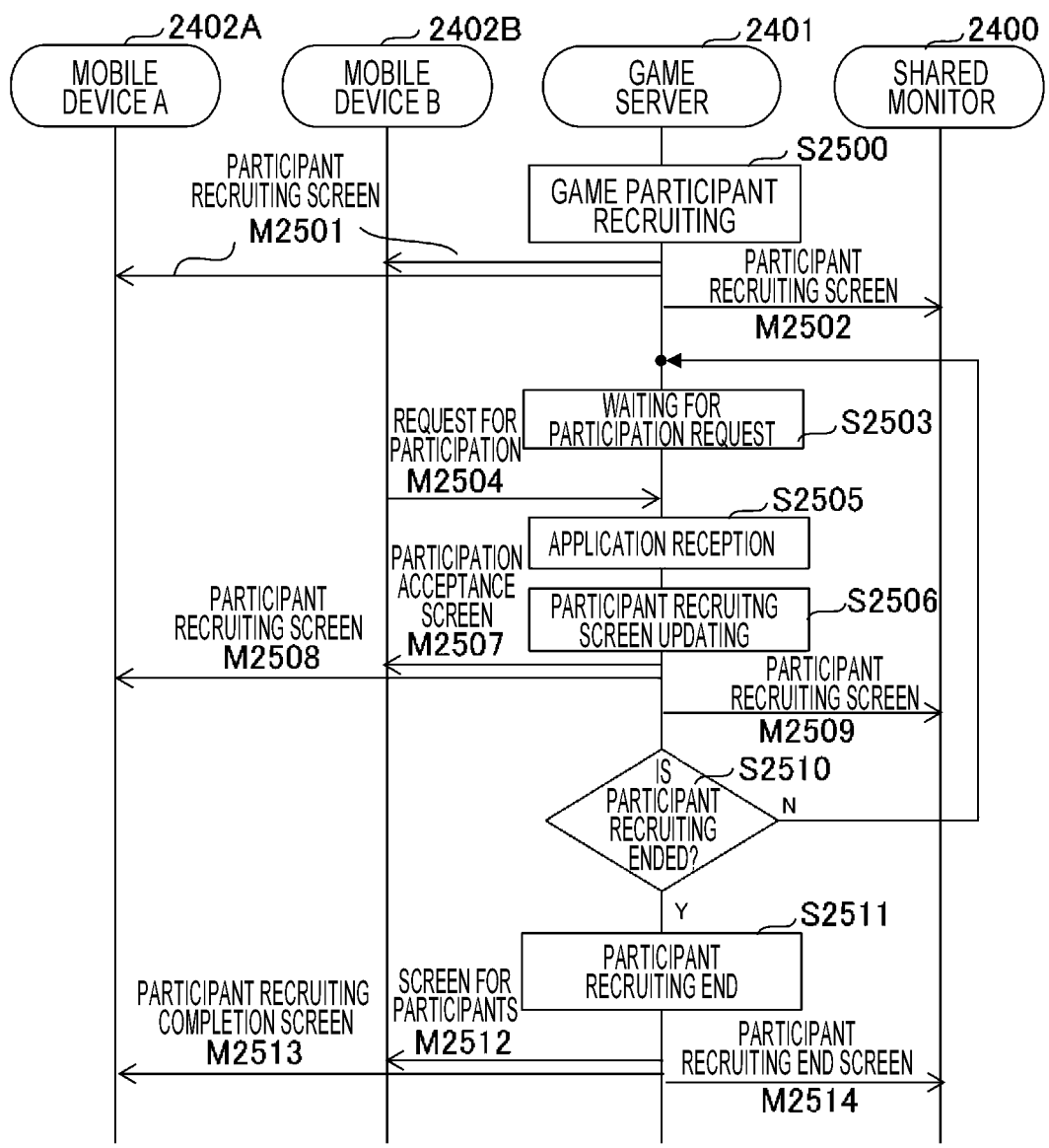
FIG. 25 shows the flow of communication until participation in the game according to the third embodiment of the present invention.

FIG. 24 shows an example of the configuration of a mobile device link system 1*c* according to the third embodiment. Mobile devices 2402A and 2402B have not only the functions of the mobile device 100 in the first and second embodiments but also the function as a controller to participate in a competition game and play the game. The game controller function may be implemented by software downloaded from a game server or may be a dedicated device for games. The shared monitor 2400 has not only the function as the linked device 2100 in the second embodiment but also the function to serve as a large monitor viewable to many people and draw a game screen or game participating screen according to control from the game server. The game server 2401 has not only the function as the distribution server 101 in the second embodiment but also the function to accept participation in the game, make the game progress according to game operation by the user and create a game screen. The other constituent elements are the same as in the first and second embodiments. FIG. 25 shows the flow of processing and communication among the mobile devices 2402A and 2402B, game server 2401, and shared monitor 2400 until participation in the competition game.

The game server 2401 starts recruiting participants in the game (S2500). In the present invention, the trigger to start participation in the game is not limited but it may be triggered from a mobile device in the area or the game managing site may request the game server 2401 to start recruiting participants in the game, via the internet communication network from a communication device (not shown). When recruiting participants in the game, the game server 2401 should be notified of the ID of the local communication area in which the game is distributed.

Figure 27A:
FIG. 27A shows an example of the screen display until participation in the game according to the third embodiment of the present invention.
Figure 27B:
FIG. 27B shows an example of the screen display until participation in the game according to the third embodiment of the present invention.

At Step S2500, a game participant recruiting screen for mobile devices and the shared monitor is created. According to the ID of the local communication area as the object of distribution and referring to the list information described in FIG. 22A and FIG. 22, the game server 2401 identifies the ID of the device which is connected to the area and has valid right information, and the ID of the linked device for it. The game server 2401 sends the created game participant recruiting screen for mobile devices to all the devices connected to the area (M2501) and sends the game participant recruiting screen for the shared monitor to the shared monitor 2400. FIG. 27A shows an example 2700 of the participant recruiting screen for mobile devices and FIG. 27B shows an example 2701 of the participant recruiting screen for the shared monitor. Then the game server 2401 enters the waiting mode for a request for participation (S2503).

When the game server 2401 is in the waiting mode for a request for participation, the mobile device 2402B transmits a participation request message (M2504). Transmission of the participation request message (M2504) may be performed by the user pushing the "PARTICIPATE" button on a participant recruiting screen 2700 shown in FIG. 27A or doing similar operation. The participation request message (M2504) at least contains the device ID.

As the game server 2401 receives the participation request message, it performs the application reception process (S2505). In the application reception process (S2505), according to the device ID contained in the participation request message (M2504) and referring to the connected device list 1701 described in FIG. 22A and FIG. 22B, the right information given to this device is checked. Whether the participation request is accepted or rejected is decided according to the content of the right information. As an example of the method for deciding the acceptance of the participation request, the decision may be made according to whether or not the right information is before the deadline. If the content of the right has two or more levels (for example, right to paid service and right to free service), acceptance or rejection of the participation request may be decided depending on the level.

Figure 27C:
FIG. 27C shows an example of the screen display until participation in the game according to the third embodiment of the present invention.
Figure 27D:
FIG. 27D shows an example of the screen display until participation in the game according to the third embodiment of the present invention.
Figure 27E:
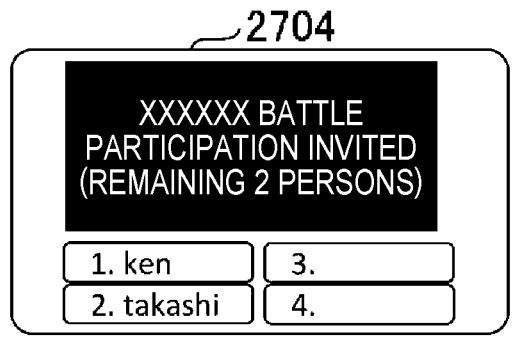
FIG. 27E shows an example of the screen display until participation in the game according to the third embodiment of the present invention.

After that, the game server 2401 updates the participant recruiting screen (S2506) and sends the updated screen information to the mobile devices 2402A and 2402B and the shared monitor 2400. The participation acceptance screen M2507 is a screen which appears on the mobile device B (2402B) which has applied for participation. FIG. 27C and FIG. 27D show examples of the participation acceptance screen M2507. A participation acceptance screen 2702 in FIG. 27C is a screen which indicates acceptance of participation and may urge the user to enter information such as a nickname for game participation. Or a participation acceptance screen 2703 in FIG. 27D may enable the user to select whether to wait for participation when there are many applicants for participation. The participant recruiting screen M2508 is a screen which appears on the mobile device A (2402A) which has not applied for participation. This screen may be the same as the participant recruiting screen 2700 in FIG. 27A or may display the successively updated number of remaining participants. The participant recruiting screen M2509 is a screen which appears on the shared monitor 2400 and FIG. 27E shows an example of it. It may display the successively updated information on applications for participation, like the participant recruiting screen M2704 in FIG. 27E.

Figure 27F:
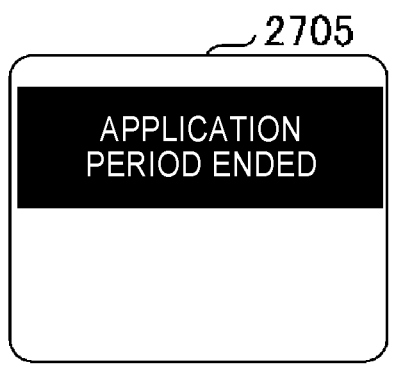
FIG. 27F shows an example of the screen display until participation in the game according to the third embodiment of the present invention.
Figure 27G:
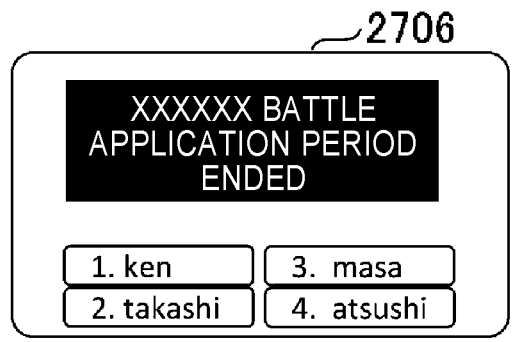
FIG. 27G shows an example of the screen display until participation in the game according to the third embodiment of the present invention.
Figure 27H:
FIG. 27H shows an example of the screen display until participation in the game according to the third embodiment of the present invention.

The game server 2401 makes conditional decision about whether to end recruiting of participants (S2510). For example, the conditional decision method may be based on whether the enrollment limit is reached or whether the enrollment period expires. If at Step S2510 it is decided that participant recruiting is not ended, the game server 2401 again returns to the participation request waiting mode (S2503) and repeats the above steps. If at Step S2510 it is decided that participant recruiting is ended, the participant recruiting end process is performed (S2511). In the participant recruiting end process (S2511), the participation request waiting process (S2503) is stopped, a screen after the end of participant recruiting is created and the screen information is sent to the mobile devices 2402A and 2402B and the shared monitor 2400. The screen for participants M2512 is a screen to be sent to the mobile device B (2402B) going to participate in the game and for example, it may tell that the game will start soon, like the screen for participants 2707 shown in FIG. 27H. The participant recruiting completion screen M2513 is a screen to be sent to the mobile device A (2402A) not going to participate in the game and it may tell that participant recruiting is ended, like a participation reception end screen 2705 in FIG. 27F. The participant recruiting completion screen M2514 is a screen to be sent to the shared monitor 2400 and it may tell that participant recruiting is ended, for example, as shown in a participation reception end screen 2706 in FIG. 27G or it may display application information such as a game player nickname.

Figure 26:
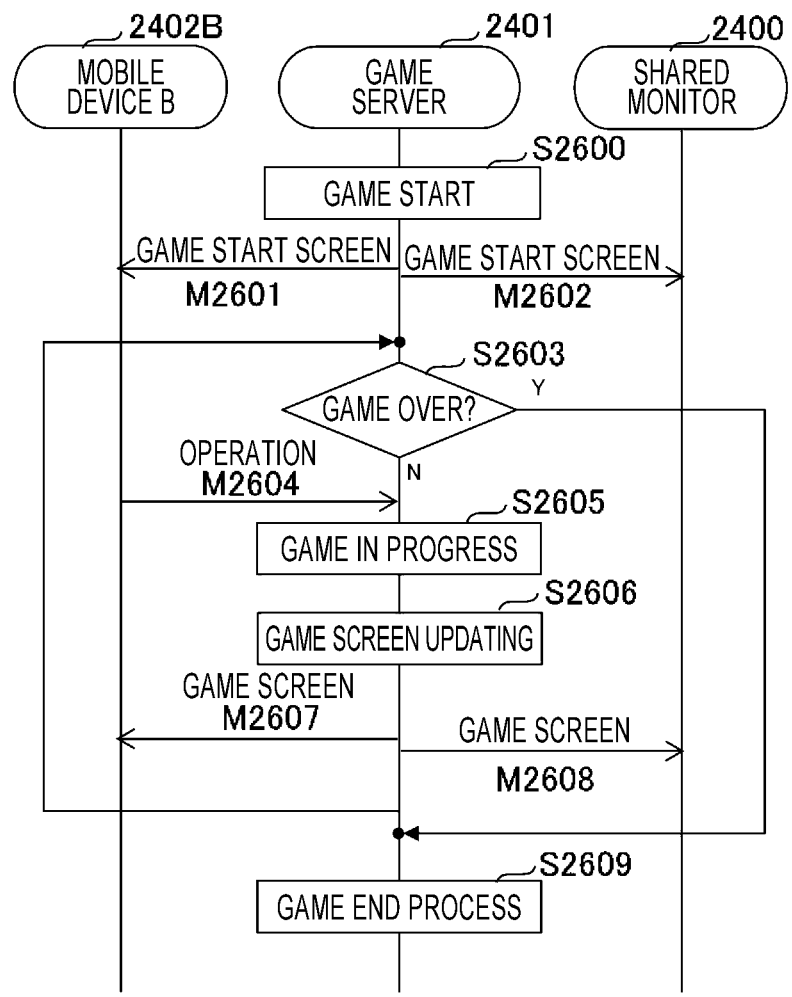
FIG. 26 shows the flow of communication from game start until game end according to the third embodiment of the present invention.

After that, a participatory game is started through the game server 2401 and the shared monitor 2400. FIG. 26 shows the flow of communication among the mobile device B (2402B), game server 2401 and shared monitor 2400 from the start of the game until its end.

As the game server 2401 starts the game (S2600), the screen is updated and sent to the mobile device 2402B and shared monitor 2400. Then, as user operation (M2604) on the mobile device B (2402B) participating in the game is sent to the game server 2401, the game server 2401 makes the game progress according to the user operation event, updates the game screen accordingly (S2606) and sends the updated screen information to the mobile device B (2402B) and the shared monitor 2400 (M2607, M2608). Going back to Step S2603, the above steps are repeated until the game-over state. When the game-over state is reached at Step S2603, the game server 2401 performs the game end process (S2609). Accordingly, a game end screen may be sent to the mobile device B (2402B) and the shared monitor 2400. In the above communication, the mobile device B (2402B) constantly sends the mobile device ID while communicating with the game server 2401. The game server 2401 may check whether or not the ID has the right to participation in the game, according to the device ID and referring to the connected device list 1701 shown in FIG. 22.

As mentioned above, in the above example, since a plurality of mobile devices located near the shared monitor are associated with the shared monitor through the game server, it is possible to participate in the game while operating the mobile device and enable many people to view the progress of the game on the shared monitor. When the game in which participation can be made only near the shared monitor is realized, it can be a highly entertaining game available only near the monitor.

Next, an example of a participatory game between different local communication areas will be described.

Figure 28:
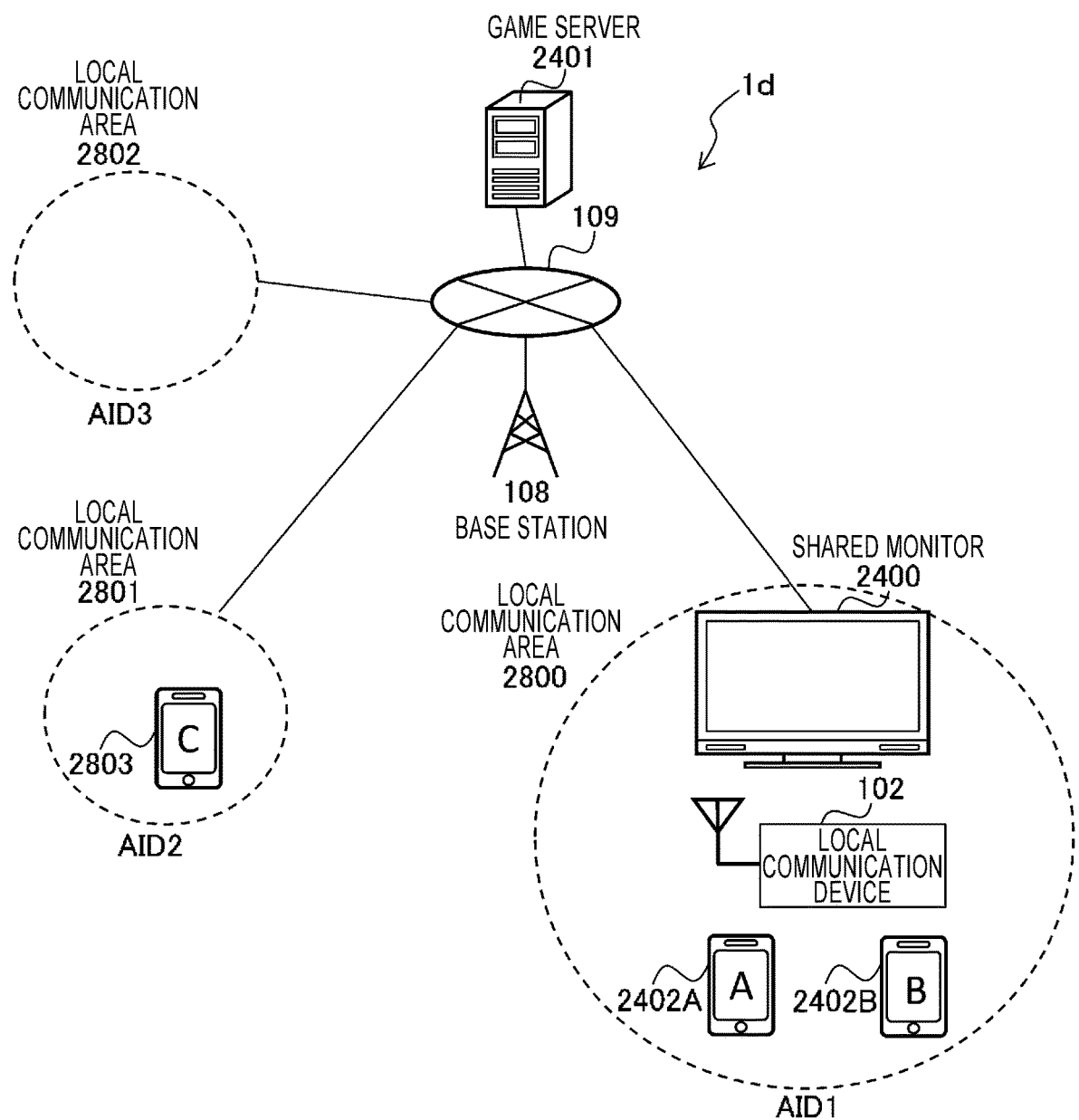
FIG. 28 is a system configuration diagram which explains the flow until competition game participation between areas according to the third embodiment of the present invention.

FIG. 28 shows a mobile device link system 1d in which the game server 2401 manages three local communication areas 2800, 2801, and 2802. Specifically, these local communication areas are assumed to be contained in the local communication area list (2200 or 1700 in FIG. 22) managed by the game server 2401 (their respective area IDs are AID1, AID2, and AID3). In FIG. 28, for the convenience of explanation, the distribution area is not shown but actually the distribution area is set and recommendation information for participation in the game is distributed in the distribution area.

Figure 29:
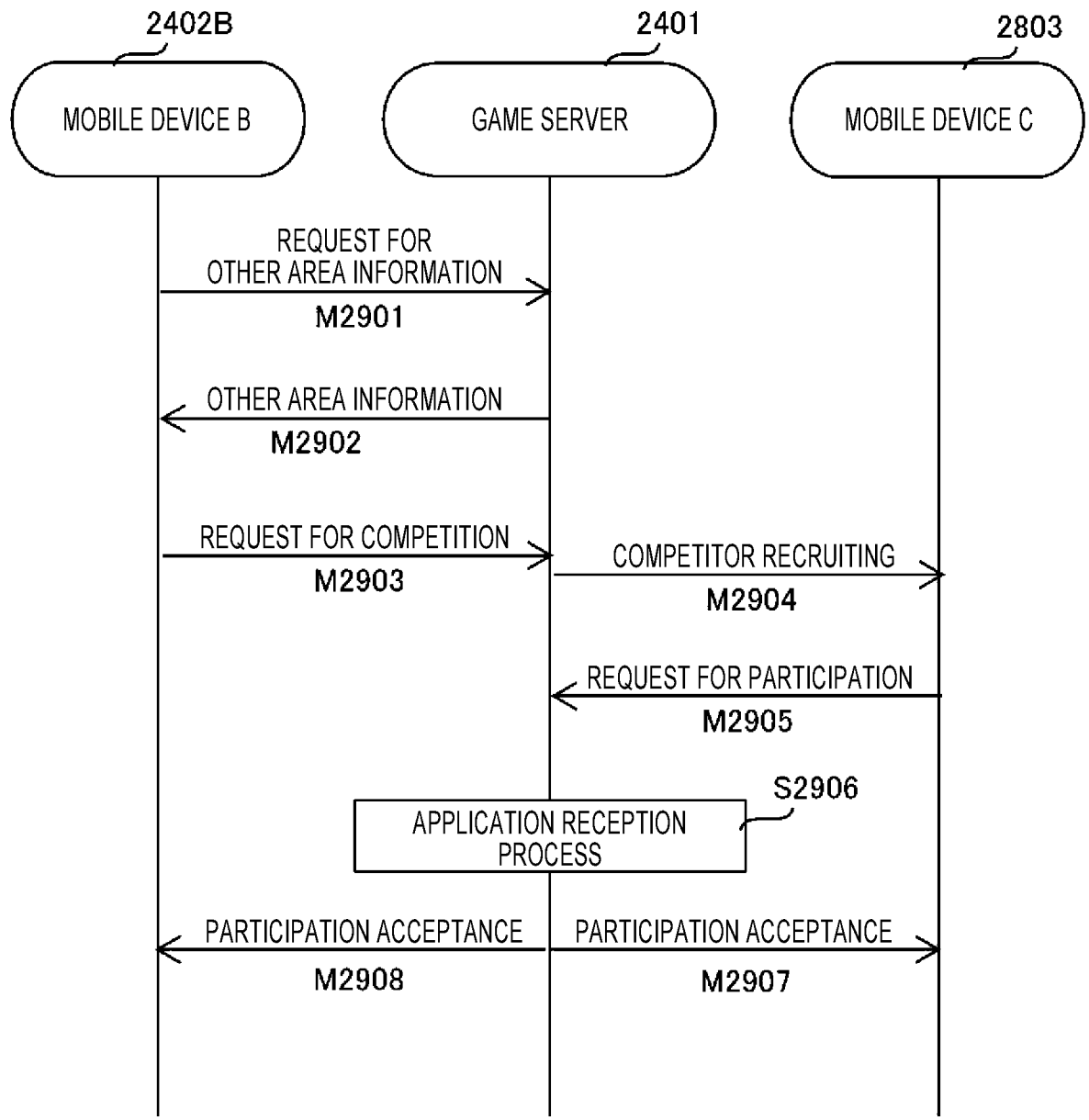
FIG. 29 shows the flow of communication until competition game participation between areas according to the third embodiment of the present invention.

FIG. 29 shows the flow of communication until the mobile device B (2402B) in the local communication area 2800 starts a competition game with the mobile device C (2803) in the local communication area 2801.

The mobile device B (2402B) sends a message to request information on other local communication areas (M2901) to the game server 2401. The game server 2401 refers to the local communication area list 2200 in FIG. 22 and the connected device list 1701 in each of the areas and sends back the information on the number of connected devices (M2902) in each area to the mobile device B (2402B). An example of this information displayed on the mobile device B (2402B) is shown as competitor candidate area information 3000 in FIG. 30. As shown here, the user may select an area on the mobile device B (2402B) from the information on the number of persons connected to each area. In the mobile device B (2402B), the user selects the desired area for competition from the competitor candidate area information 3000 and sends a competition request message (M2903) to the game server 2401. The competition request message (M2903) contains the area ID of a competitor candidate area. The game server 2401 refers to the connected device list 1701 corresponding to the area ID to which competition is requested and sends a competitor recruiting message (M2904) to all the devices connected to that area. In the figure, for simplification of explanation, only the mobile device C (2803) is shown but the same is true for all the mobile devices connected to the competition-requested area. Although not shown in the figure, the competitor recruiting message (M2904) may be sent to the shared monitor in the competition-requested area. FIG. 30B shows an example of the display on the mobile device C (2803) in the local communication area 2801 to which competition is requested, as a competitor recruiting screen 3001.

Figure 30A:
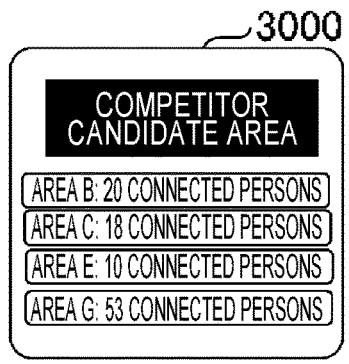
FIG. 30A shows an example of the screen display until competition game participation between areas according to the third embodiment of the present invention.
Figure 30B:
FIG. 30B shows an example of the screen display until competition game participation between areas according to the third embodiment of the present invention.

When the user of the mobile device C (2803) pushes the "PARTICIPATE" button on the competitor recruiting screen 3001 in FIG. 30A, a participation request message M2905 is sent to the game server 2401. The game server 2401 performs the application reception process (S2906) for the participation request message M2905. The application reception process (S2906) is the same as the application reception process (S2505) in FIG. 25. Specifically, the right information given to the device is checked according to the device ID contained in the participation request message (M2905) and referring to the connected device list 1701 described in FIG. 22. Whether the participation request is accepted or rejected is decided according to the content of the right information.

Figure 30C:
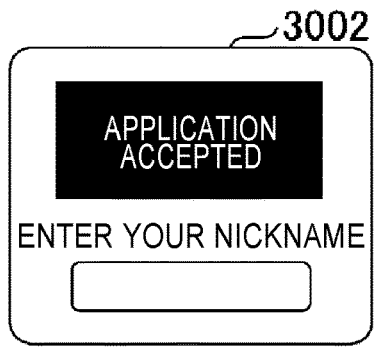
FIG. 30C shows an example of the screen display until competition game participation between areas according to the third embodiment of the present invention.
Figure 30D:
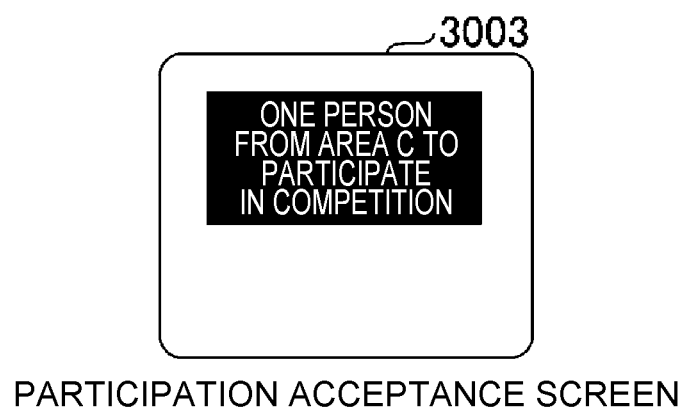
FIG. 30D shows an example of the screen display until competition game participation between areas according to the third embodiment of the present invention.

After that, the game server 2401 sends a participation acceptance message to the mobile device B (2402B) and mobile device C (2803) (M2908, M2907). FIG. 30D shows an example of the participation acceptance screen displayed on the mobile device B (2402B), as a participation acceptance screen 3003. As shown here, it may tell that a competitor will participate from the area from which a competition request is issued. FIG. 30C shows an example of the participation acceptance screen displayed on the mobile device C (2803), as a participation acceptance screen 3002. The participation acceptance screen 3002 may tell that the participation request has been received. These screens may appear on the shared monitor in each local communication area.

The subsequent flow of communication during playing of the game is the same as the flow shown in FIG. 26. The difference from FIG. 26 is that the game screen is sent to the shared monitor linked to each mobile device.

As mentioned above, participation in the game can be made between two or more local communication areas through the game server 2401. Also, the game screen appears on the shared monitor in each area and many people can view it. Due to this structure of the present invention, the customer attracting effect is expected to be increased around the shared monitor in each area.

(4) Fourth Embodiment (Large Monitor+Enlivening Effect)

The fourth embodiment of the present invention shows an example that when in the second embodiment a large shared monitor is taken as a linked device and the users around the monitor view the common content on the shared monitor, the liveliness of the surroundings is enhanced by a mobile device.

Figure 31:
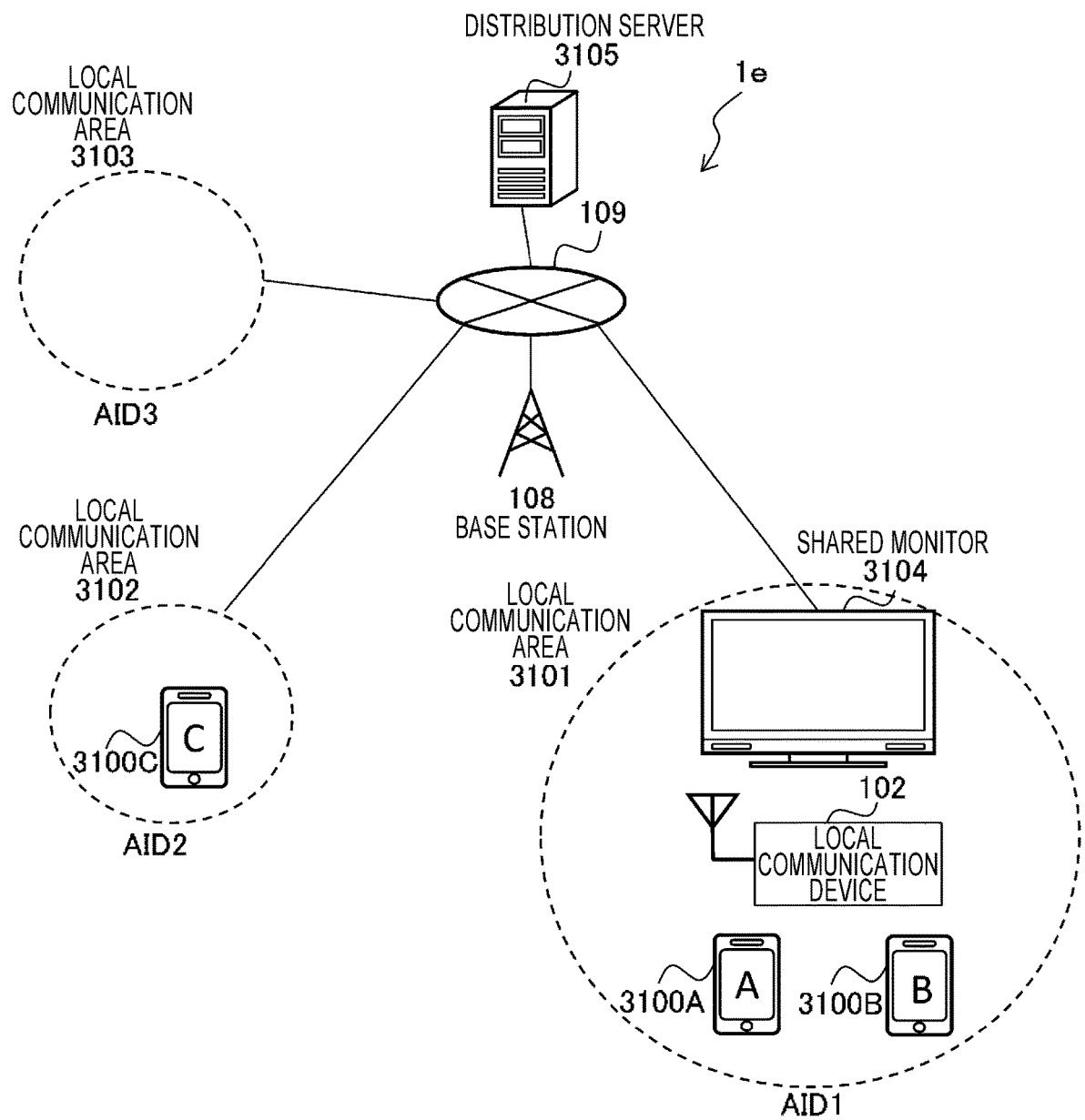
FIG. 31 shows the configuration of the mobile device link system according to a fourth embodiment of the present invention.

FIG. 31 shows an example of the configuration of a mobile device link system 1e according to the fourth embodiment. The mobile devices 3100A, 3100B, and 3100C have not only the functions of the mobile device 100 in the first and second embodiments but also the interface function to enable the user to select and carry out the enlivening effect, as will be described later. The interface function for an enlivening effect may be implemented by software downloaded from a distribution server 3105 or by a dedicated device. A shared monitor 3104 has not only the function as the linked device 2100 in the second embodiment but also the function as a large monitor viewable to many people to enable drawing and output sound or sound effects for an enlivening effect according to control from the distribution server 3105. The distribution server 3105 has not only the function of the distribution server 101 in the second embodiment but also the function to create and transmit a content for an enlivening effect according to an enlivening effect request from a mobile device. The other constituent elements are the same as in the first and second embodiments. In FIG. 31, for the convenience of explanation, the distribution area is not shown but actually the distribution area is set and recommendation information for participation in the game is distributed in the distribution area.

FIG. 32 shows the flow of communication until the mobile device B (3100B) outputs an enlivening effect on the shared monitor 3104 in the local communication area 3101.

FIG. 32 assumes a situation in which the service provision processing section 254 of the distribution server 3105 sends a content to the shared monitor 3104 and the content is outputted on the shared monitor 3104 and viewed by many users around the monitor. In the present invention, the content is not limited but a live sports broadcast or live music broadcast which many people view with excitement is expected. Or it may be a competition game screen as described in the third embodiment.

An enlivening command message (M3201) is sent from the mobile device B (3100B) to the distribution server 3105. An example of the method for sending an enlivening command message (M3201) is to offer various enlivening effects to the user and enable the user to select an enlivening effect among them.

Figure 33A:
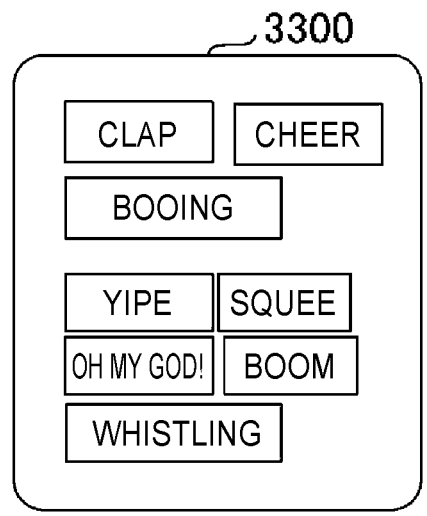
FIG. 33A shows an example of the display screen of the mobile device according to the fourth embodiment of the present invention.
Figure 33B:
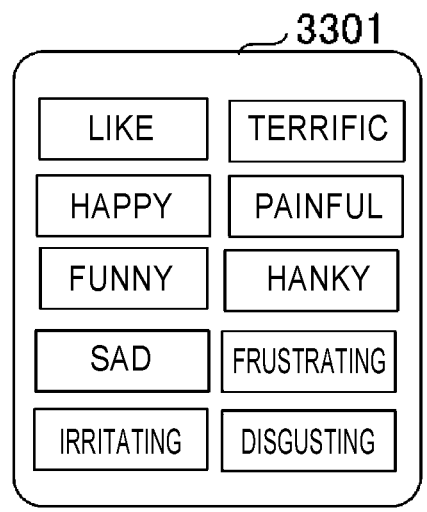
FIG. 33B shows an example of the display screen of the mobile device according to the fourth embodiment of the present invention.
Figure 33C:
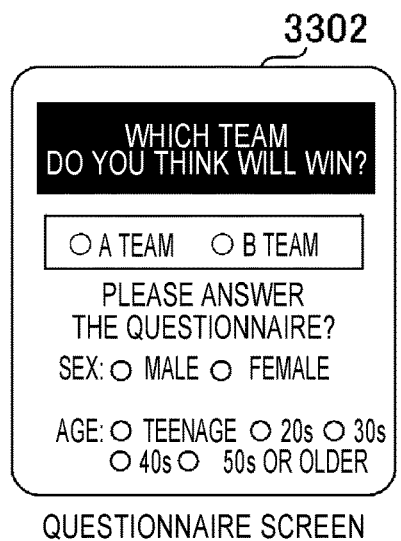
FIG. 33C shows an example of the display screen of the mobile device according to the fourth embodiment of the present invention.

FIG. 33A, FIG. 33B, and FIG. 33C show examples of enlivening effects offered to the user. A sound effect selection screen 3300 in FIG. 33A offers sound effect options to the user. For example, the options may be general names, icons, pictograms or the like, depicting such sounds as "handclap" and "cheer" or onomatopoeic words such as "yipe" and "squee". Or a desired character string may be entered. A feeling selection screen 3301 in FIG. 33B offers feeling options to the user. It may offer various options of feeling information, such as "LIKE" and "SAD", in the form of characters, icons, pictograms and the like. Or, sensor information from the sensor section 200 of the mobile device 3100B may be sent at regular intervals. For example, it may be a mobile device acceleration sensor signal or an ambient sound signal from a microphone.

As the service provision processing section 254 of the distribution server 3105 receives the enlivening command message (M3201), it refers to the connected device list 1701 from the device ID contained in the enlivening command message (M3201) and checks whether the right information is valid or invalid (S3200). If the right information is invalid, the subsequent steps are not performed. If the right information is valid, the device ID of the shared monitor linked to the device ID is acquired.

Once the validity of the right information of the mobile device B (3100B) is confirmed at Step S3200, the service provision processing section 254 creates an enlivening content (S3202). If the enlivening effect is a sound effect as mentioned above, a sound signal corresponding to the sound effect may be generated. The method for generating the sound signal may be to store sound source data for various sound effects in the distribution server 3105 in advance or to synthesize a sound signal using a sound synthesizing function by input of character strings. If the enlivening effect is feeling information as mentioned above, an image suitable for it may be created as an enlivening content.

The service provision processing section 254 sends the enlivening content (M3203) thus created to the shared monitor 3104. The enlivening content (M3203) may be sent as data in a different channel from the distributed content. However, multiplexing information such as at which time or on which screen the enlivening content should appear on the distributed original content should be known to the receiving side or transmitted from the distribution server 3105.

The shared monitor 3104 superimposes and outputs the received enlivening content (M3203) on the original content (S3204). If the enlivening content is a sound effect, the shared monitor 3104 outputs a signal with the sound effect added to the original content sound. If the enlivening content is feeling information, an image or color suitable for the feeling information appears on part of the monitor screen. In this case, it need not always appear within the screen frame of the original content but it may appear outside the screen frame.

Figure 34:
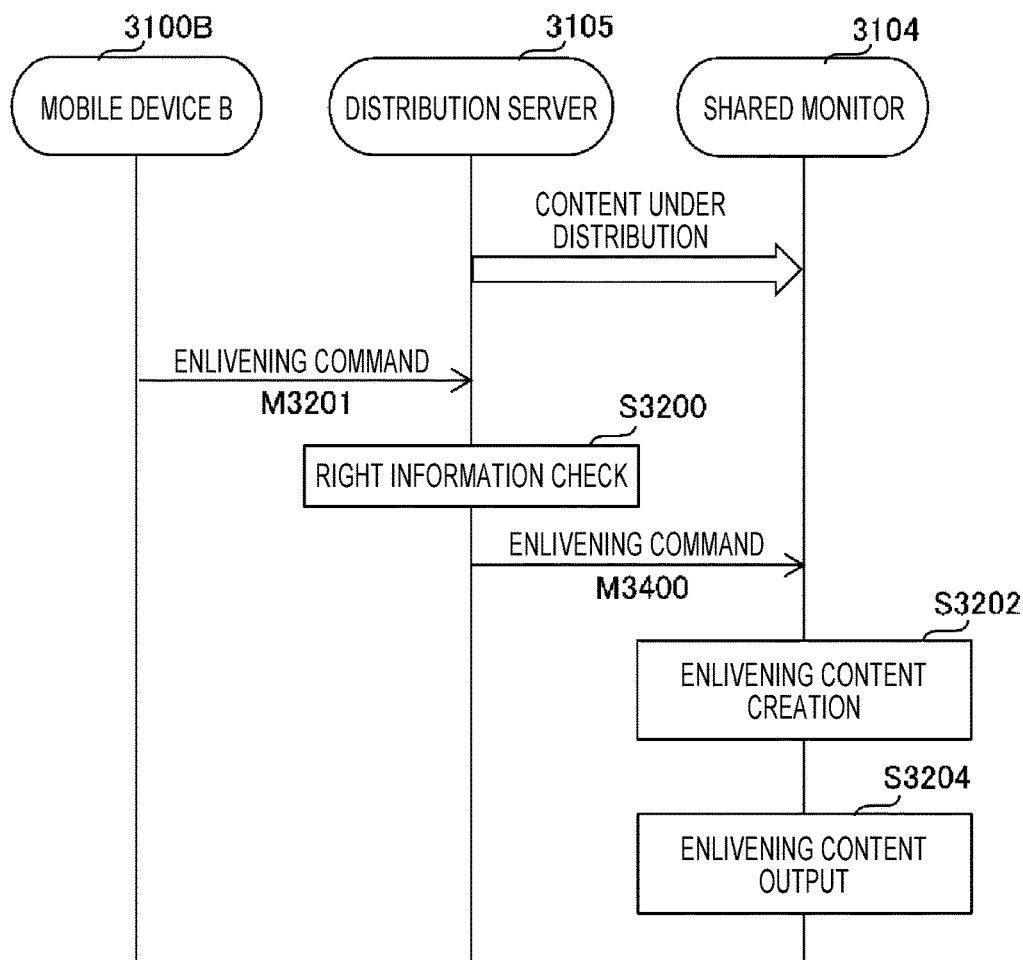
FIG. 34 shows the flow of a second example of communication in the mobile device link system according to the fourth embodiment of the present invention.

FIG. 32 shows an example that the enlivening content is created on the distribution server 3105 and transmitted. However, if there is a sound source, image or the like corresponding to the sound effect on the shared monitor, the shared monitor 3104 can perform the enlivening content creating process (S3202). In this case, the service provision processing section 254 performs the process to distribute the content and the enlivening command message (M3400). FIG. 34 shows the flow of communication in this case. The difference from FIG. 32 is that after the distribution server 3105 checks the right information of the enlivening command (M3201) (S3200), it sends the enlivening command (M3400) to the shared monitor 3104 and the shared monitor 3104 creates the enlivening content (S3202). This enlivening command (M3400) may be the same as the enlivening command (M3201) from the mobile device. It may contain multiplexing information such as at which time or in which position of the screen the enlivening content should appear on the original content. The other steps are the same as the content described in FIG. 32.

Figures 35A, 35B:
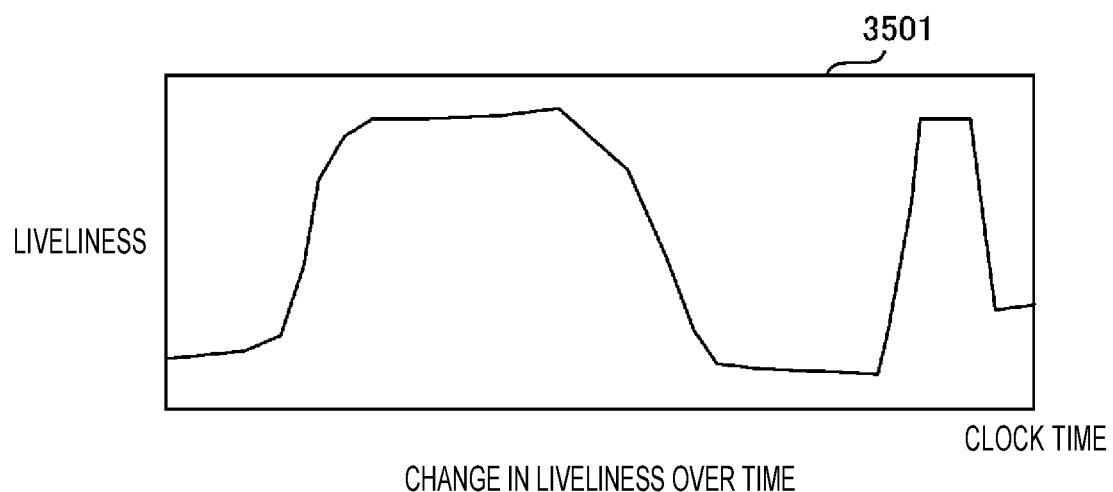
FIG. 35A shows an example of totalization of liveliness in the mobile device link system according to the fourth embodiment of the present invention.
FIG. 35B shows an example of totalization of liveliness in the mobile device link system according to the fourth embodiment of the present invention.

The service provision processing section 254 of the distribution server 3105 may totalize the enlivening commands M3201 from mobile devices in the local communication areas (3101, 3102, and 3103 in FIG. 31) on an area-by-area basis. The totalization result may be publicized so that it is accessible via the internet 109. FIG. 35A and FIG. 35B show examples of the totalization result. A table 3500 in FIG. 35A is a table which summarizes the degree of liveliness in each area. The table 3500 indicates the distributed content information, the degree of liveliness, the number of connected devices, and "LIKES" count in each area. Here, the degree of liveliness may be, for example, a value calculated by addition of a previously weighted value for each enlivening command (M3201). When the degree of liveliness in each area can be referred to from outside, information about which area is lively can be known from outside, which may encourage users to move between areas. In a graph 3501 in FIG. 35B, liveliness at regular time intervals is totalized and its change over time is plotted. Thus, which time zone is lively in the distributed content can be visualized.

Like a questionnaire screen 3302 in FIG. 33C, the questionnaire screen 3302 enabling sport spectators to predict the winning team may be distributed to the devices in the local communication area 103 to urge the user to give a reply, so that the replies are totalized by the distribution server 3105 and the total is displayed on the shared monitor 3104. In addition, by encouraging the user to enter user profile information in the questionnaire, the profile information including the male-to-female ratio and ages of the users in each area may be collected.

As mentioned above, in the mobile device link system in the fourth embodiment of the present invention, the users of a plurality of mobile devices located near the shared monitor can issue enlivening commands for sound effects or feeling buttons for the content viewed by them at the same time so that the commands are reflected on the shared monitor, and thus it is expected that the enlivening effect can be enhanced among the viewers of the content on the spot. Also, by totalizing the enlivening commands in each area, which area is lively in which time zone or the like can be known and the effect to attract the users to the target area can be enhanced.

(5) Fifth Embodiment (Large Monitor+Advertisement Distribution)

The fifth embodiment of the present invention shows an example that the large shared monitor is taken as a linked device in the second embodiment and an advertisement content is distributed to the shared monitor according to the profile information of the user around the monitor.

Figure 36:
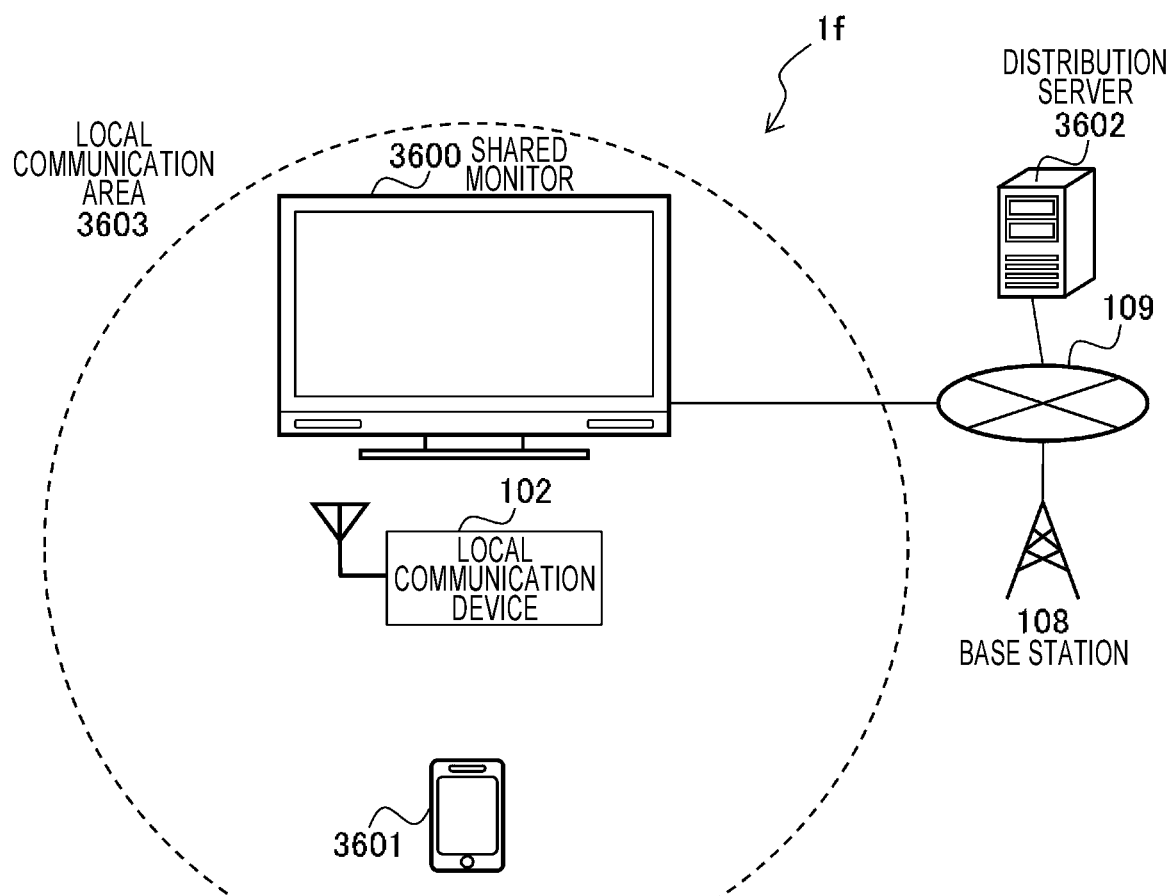
FIG. 36 shows the configuration of the mobile device link system according to a fifth embodiment of the present invention.

FIG. 36 shows an example of the configuration of the mobile device link system according to the fifth embodiment. A mobile device 3601 has not only the functions of the mobile device 100 in the first and second embodiments but also the interface function to acquire and send user information, as will be described later. The interface function may be implemented by software downloaded from a distribution server 3602 or may be a dedicated device. A shared monitor 3600 has not only the function of the linked device 2100 in the second embodiment but also the function as a large monitor viewable to many people to output the content received from the distribution server 3602. The distribution server 3602 has not only the function of the distribution server 101 in the second embodiment but also the function to select an advertisement content for the user information of the mobile device 3601 and send it to the shared monitor 3600. The other constituent elements are the same as in the first and second embodiments. In FIG. 36, for the convenience of explanation, the distribution area is not shown but actually the distribution area is set and recommendation information is distributed in the distribution area.

Figure 37:
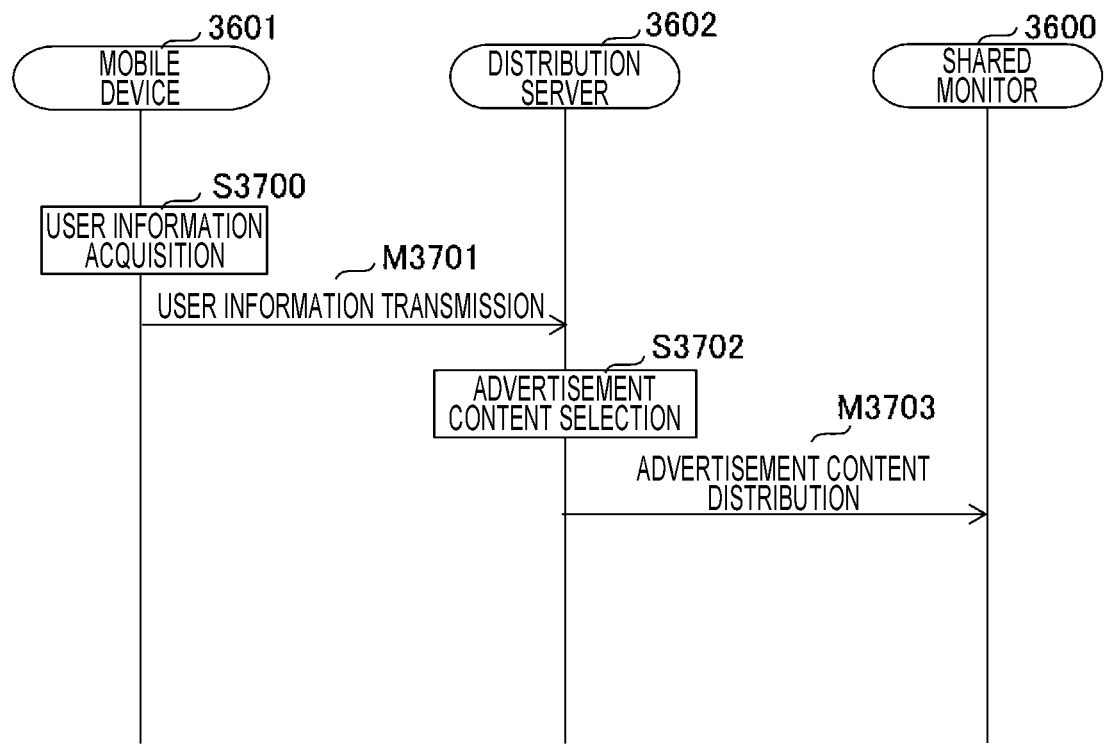
FIG. 37 shows the flow of communication in the mobile device link system according to the fifth embodiment of the present invention.
Figure 38:
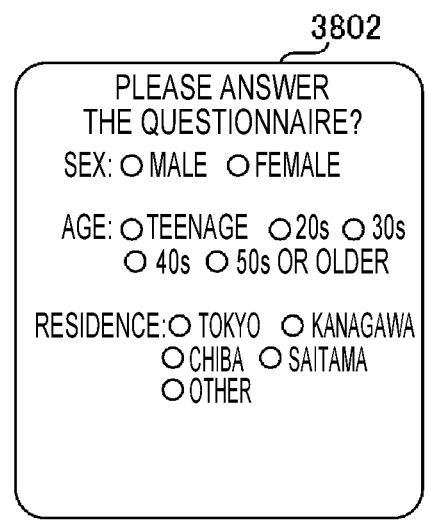
FIG. 38 shows an example of the screen display for user information acquisition according to the fifth embodiment of the present invention.

FIG. 37 shows the flow of communication until the advertisement content is outputted on the shared monitor 3600 according to the user information of the mobile device 3601 in a local communication area 3603. In FIG. 37, the user information is acquired in the mobile device 3601 (S3700). As an example of user information acquisition (S3700), the user information acquisition screen as shown in FIG. 38 may be sent from the distribution server 3602 and presented to the user on the mobile device 3601 to urge the user to enter a reply and the reply is transmitted (M3701). As an example of timing of user information acquisition, it may be after completion of the right information acquisition described in FIG. 11 or the user information may be registered in a database accessible to the distribution server 3602 when the software implementing the function related to this embodiment is installed in the mobile device 3601. The user information M3701 contains a device ID and the distribution server 3602 acquires the shared monitor ID (linked device ID) corresponding to the local communication area 3603, from the local communication area list 2200 in FIG. 22A or FIG. 22B.

Next, the distribution server 3602 selects the advertisement content according to the user information (S3702). At Step S3702, the distribution server 3602 collects the user information of the mobile device 3601 connected in the local communication area 3603. Group information of the users around the shared monitor 3600, for example, the number of persons, male-to-female ratio and age ratio by this information collection. According to such user group information, the advertisement content may be selected by a predetermined rule. For example, if the ratio of young women is high, boutique information or sweets shop information may be selected and if the ratio of housewives is high, sale information may be selected. Or, a formula to calculate the advertisement hit rate from the male-to-female ratio and age ratio may be previously defined for each advertisement content so that the advertisement to maximize the hit rate is determined by this calculation. Furthermore, the advertisement content may be changed depending on not only the user information but also the time zone.

The advertisement content thus selected (M3703) is distributed from a distribution server 2602 to the shared monitor 3600 and outputted on the shared monitor 3600.

As mentioned above, in the mobile device link system in the fifth embodiment of the present invention, the advertisement content is selected according to the user information of a plurality of mobile devices located near the shared monitor and distributed to the shared monitor. Consequently, an advertisement highly appealing to the users around the target area can be distributed and thus the buying motivation of the users may be increased.

(6) Sixth Embodiment (Large Monitor+Later Access)

The sixth embodiment of the present invention shows an example that the large shared monitor is used as a linked device in the second embodiment and the distribution server holds the record of user operation for the content distributed to the shared monitor so that the content can be accessed again by referring to the user operation record on a PC or the like in another time zone.

Figure 39:
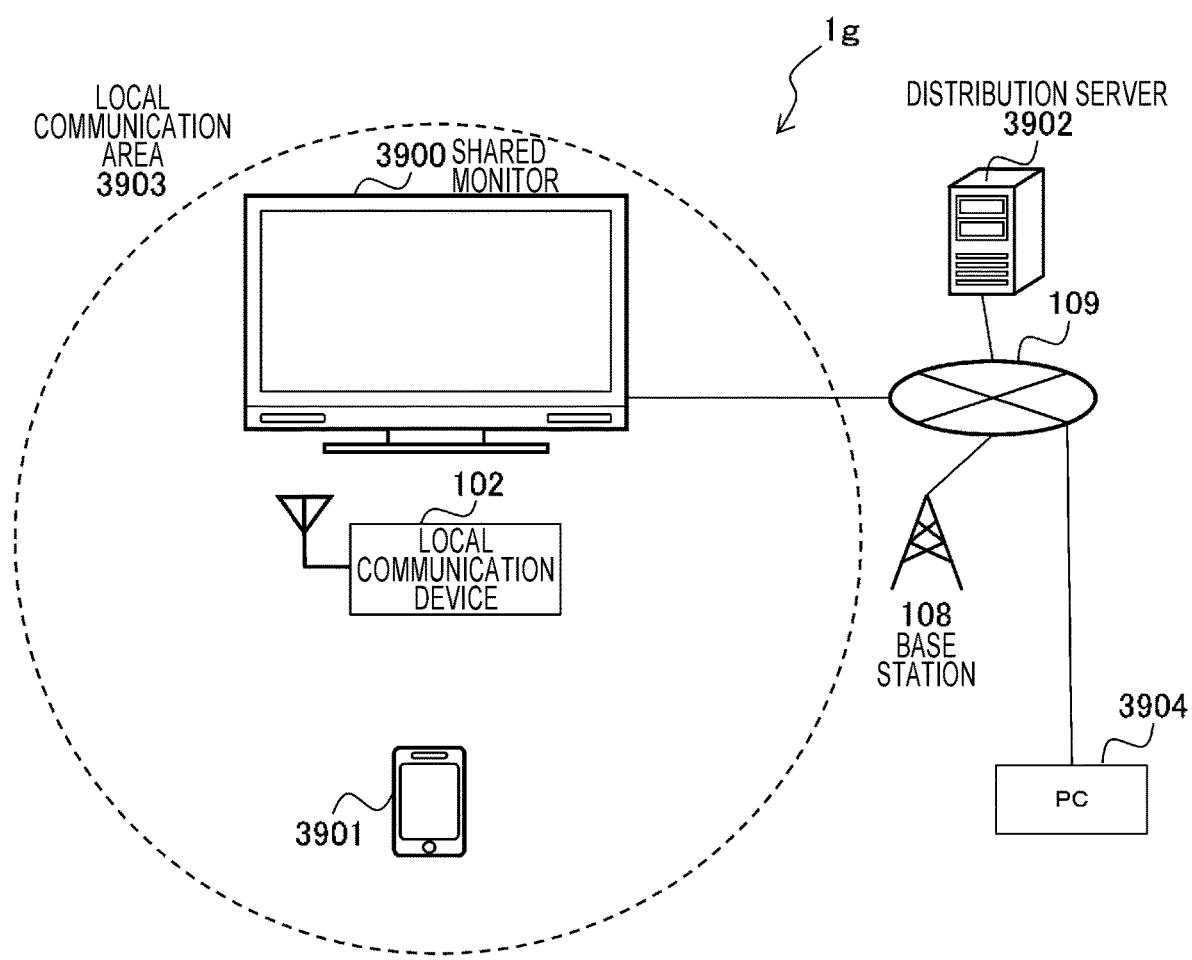
FIG. 39 shows the configuration of the mobile device link system according to a sixth embodiment of the present invention.

FIG. 39 shows an example of the configuration of a mobile device link system 1g according to the sixth embodiment. A mobile device 3901 has not only the function of the mobile device 100 in the first and second embodiments but also the interface function to select and send user action information, as will be described later. The interface function may be implemented by software downloaded from a distribution server 3902 or may be a dedicated device. A shared monitor 3900 has not only the function as the linked device 2100 in the second embodiment but also the function as a large monitor viewable to many people to output the content received from the distribution server 3902. In FIG. 39, for the convenience of explanation, the distribution area is not shown but actually the distribution area is set and recommendation information is distributed in the distribution area.

The distribution server 3902 has not only the function of the distribution server 101 in the second embodiment but also the function to record the user action information sent from the mobile device 3901 and send a content to the PC 3904 according to the user operation. The other constituent elements are the same as in the first and second embodiments.

Figure 40:
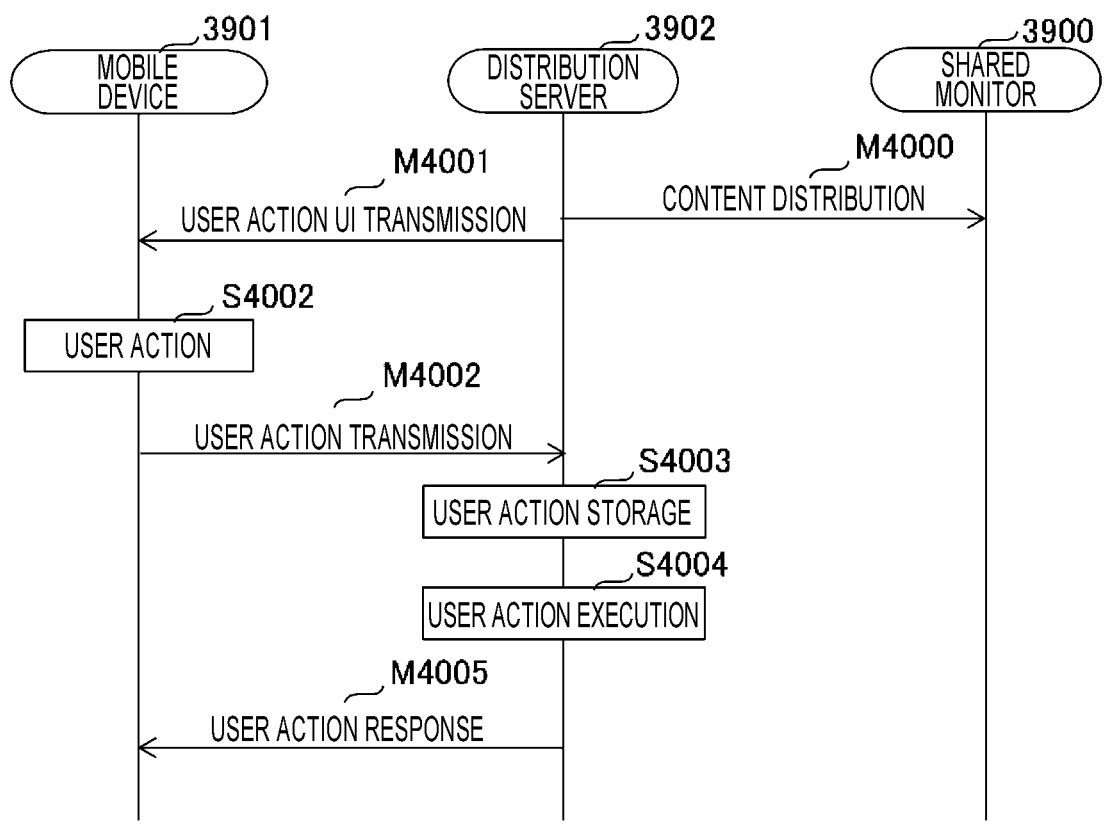
FIG. 40 shows the flow of communication until recording of user action information according to the sixth embodiment of the present invention.
Figure 42A:
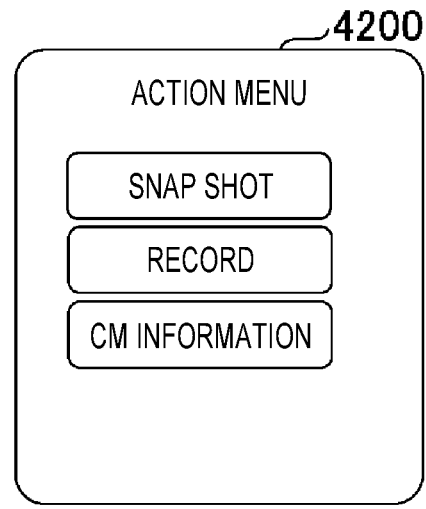
FIG. 42A shows an example of the screen display according to the sixth embodiment of the present invention.

FIG. 40 shows the flow of communication until the user action information is stored according to the user information of the mobile device 3901 in a local communication area 3903. In FIG. 40, while the distribution server 3902 is distributing the content (M4000) to the shared monitor, the distribution server 3902 sends operation UI (M4001) to the mobile device 3901. This operation UI is a UI screen for the user to execute an action for the distributed content (M4000). In the present invention, among examples of action are electing to take a snap shot of a certain scene or record some images during distribution of sports images, or electing to get detailed information on the on-air CM. FIG. 42A shows an example of a user action UI screen 4200. As the user executes a user action by operation on the user action UI screen 4200 (S4002), the selected user action (M4002) is sent to the distribution server. The user action (M4002) contains the device ID of the mobile device 3901 and also the information on the date and time of execution of the user action.

Figure 42B:
FIG. 42B shows an example of the screen display according to the sixth embodiment of the present invention.
Figures 42C, 43A:
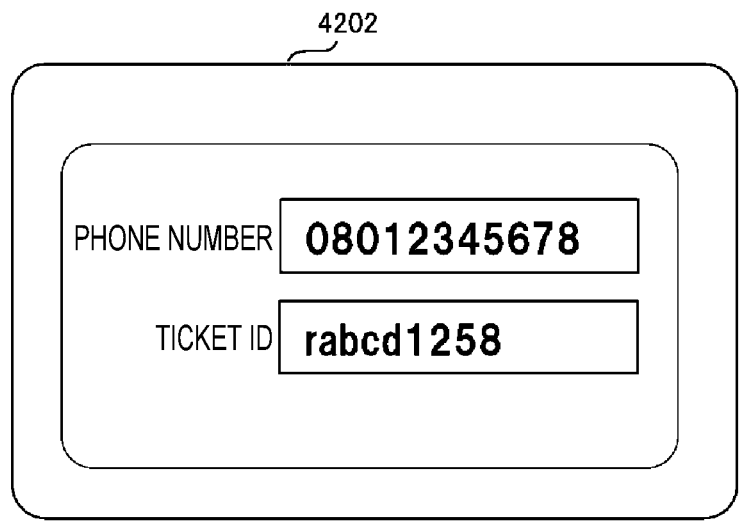
FIG. 42C shows an example of the screen display according to the sixth embodiment of the present invention.
FIG. 43A is a conceptual diagram of the user action list and distribution content list according to the sixth embodiment of the present invention.

The service provision processing section 254 of the distribution server 3902 stores the transmitted user action (M4002) information in the storage section 251 (S4003). At Step 4003, it refers to the connected device list 1701 in FIG. 22A according to the device ID and checks whether the right information is valid or invalid. If the right information is invalid, the subsequent steps are not performed. If the right information is valid, the device ID (linked device ID) of the shared monitor linked to the device ID is acquired. The distribution server 3902 creates a user action list 4300 such as that shown in FIG. 43 for each device ID and stores it in a database (not shown) accessible from the distribution server 3902. The user action list 4300 contains the ID (linked device ID) of the shared monitor linked to the device ID transmitting the user action, time of user action, and the content of user action, for each device. Also, the distribution server 3902 stores a distributed content list 4301 showing which content has been distributed at which time, for each linked device ID, in a database (not shown). When the linked device ID and time are given by referring to the distributed content list 4301, the distribution server 3902 can acquire the distributed content and content time (content start time is zero).

After that, the service provision processing section 254 of the distribution server 3902 executes the transmitted user action (M4002) (S4004). If the user action is snapshotting, a still image at that time from the content under distribution at that time is created and stored in the database (not shown). However, for an action such as snapshotting or recording, the entire content or part of the past content (for example, the past ten minutes of the content) should be stored in the content data (not shown) on the distribution server 3902 so that the content data in the past time can be accessed or decoded.

All user actions need not be executed just after transmission of a user action (M4002). For example, if the user action is "RECORD" on the screen 4200 in FIG. 42, the movie content in the recording time zone need not be created but only clock time in the recording time zone may be stored so that only the content in part of the recording time zone is re-distributed upon request for reproduction, as will be described later. Also, if the user action is "CM INFORMATION" on the user action UI screen 4200 in FIG. 42A, only the information on the preset link destination may be acquired.

After that, the distribution server 3902 sends a user action response (M4005) to the mobile device 3901. An example of the user action response (M4005) screen is shown as a user action response screen 4201 in FIG. 42B. As shown on the user action response screen 4201, it may tell the completion of the user-specified action or give information on the destination to which the result is linked. If the user action on the user action UI screen 4200 in FIG. 42A is a kind of image output such as "SNAP SHOT", the user action response (M4005) may contain its thumbnail image so that the thumbnail image appears on the user action response screen 4201.

Figure 41:
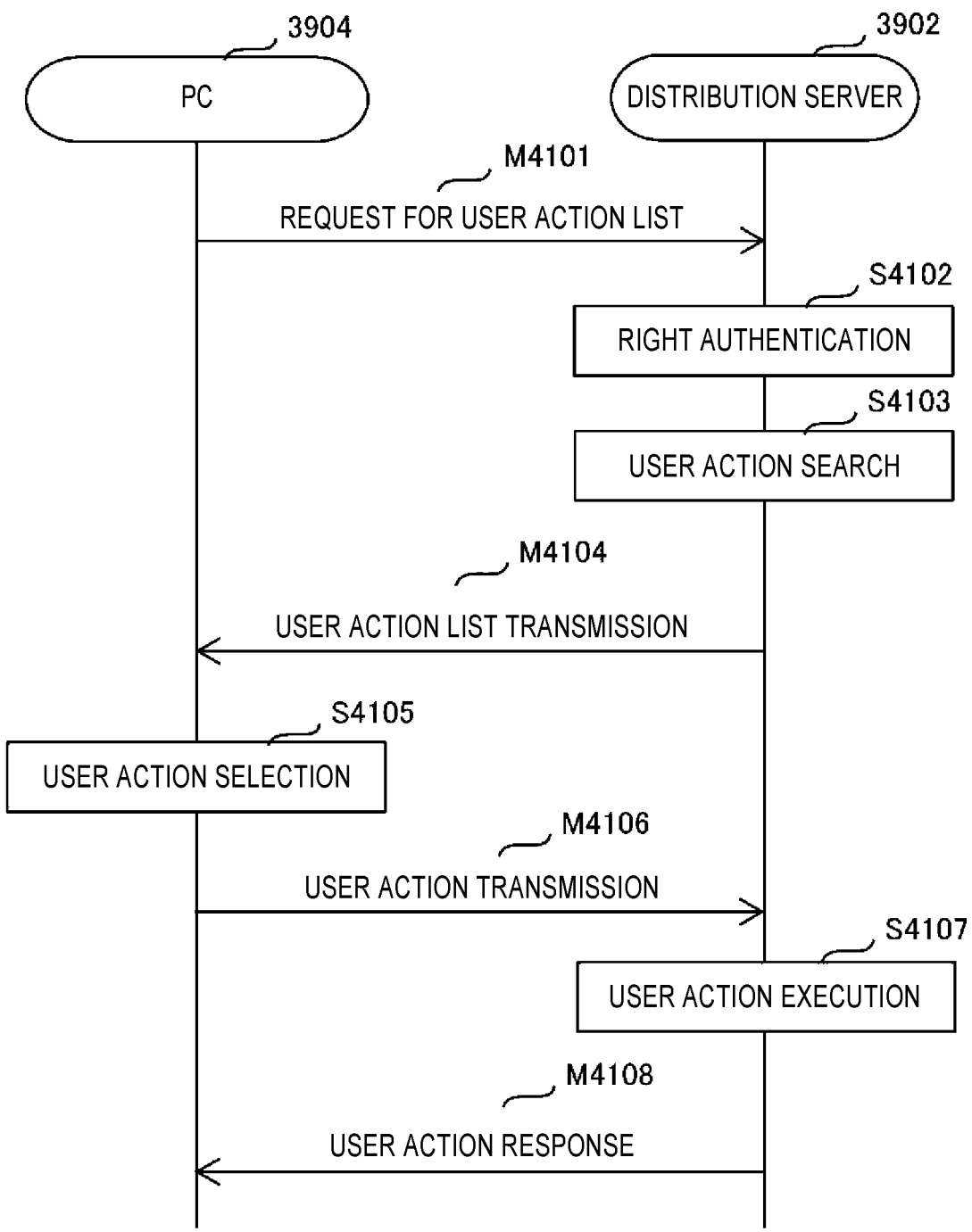
FIG. 41 shows the flow of communication in requesting a user action from another device according to the sixth embodiment of the present invention.

Next, referring to FIG. 41, an example that content redistribution by user action is requested in a different time zone from a different device will be explained. In the figure, concretely the user acquires right information near the shared monitor 3900 in the local communication area 3903 through the mobile device 3901, views the content and executes the above user action. In application, it is expected that after that, the user goes home and accesses the distribution server 3902 through the personal computer (PC) (3904) at home and executes a user action (snap shot, recorded content, CM information) to view the content again. However, the present invention can be applied to any type of device other than a PC, such as a mobile device, as far as it can access the distribution server 3902 via the internet 109 and enables viewing of the content.

First, the PC (3904) sends a user action list request (M4101) to the distribution server 3902. The user action list request (M4101) must at least contain either the ID of the right information already acquired by the user or the device ID of the mobile device 3901. These IDs may be entered by the user on the PC (3904). An example of the ID input screen is shown as an input screen 4202 in FIG. 42C. The input screen 4202 urges the user to enter the phone number as the device ID and a right information ID under the name of the ticket ID. In addition, it may also urge entry of the local communication area in which the right information has been acquired. For this purpose, for example, local communication area candidates may be listed by a pull-down menu for selection by the user.

Next, the service provision processing section 254 of the distribution server 3902 performs right authentication (S4102). In right authentication (S4102), it refers to the connected device list 1701 described in FIG. 22A or FIG. 22B using the device ID or right information ID contained in the user action list request (M4101) or both, and checks the right information ID and the right information. If the right information ID does not exist or is invalid, the distribution server 3902 notifies the PC (3904) of it and the subsequent steps are not performed.

If the right information ID is valid at Step S4102, the service provision processing section 254 of the distribution server 3902 searches the user action list (S4103). At Step S4103, it searches the user action list 4300 in FIG. 43 for each device ID corresponding to the right information ID. If the user action list corresponding to the device ID does not exist, the PC (3904) is notified of it and the subsequent steps are not performed. If the user action list corresponding to the device ID exists, the list is sent to the PC (3904) (M4104).

On the PC (3904), the user selects a user action from the transmitted user action list 4300 (S4105). For example, the information on the user action list 4300 in the form of a list may be presented to the user so that the user can select from it. The user action selected by the user is sent to the distribution server 3902 (M4106).

The distribution server 3902 executes the transmitted user action (M4106) (S4107). At Step S4107, the time of execution of the user action and the corresponding shared monitor ID (linked device ID) are acquired from the user action list 4300. The distribution server 3902 refers to the distributed content list 4301 for the linked device ID and acquires the content distributed at the time of execution of the user action and the content time (content start time is zero). Then, the user action is executed. For example, if the user action is "SNAP SHOT", a still image at that time from the content under distribution at that time is created and the still image data is sent back as a user action response (M4108) to the PC (3904). If the user action is "RECORD", only the content in the part of the time zone specified by the user action is re-distributed. If the user action is "CM INFORMATION", the preset link destination information may be acquired or the link destination may be accessed or if the link destination is a moving image or still image, it may be distributed.

As mentioned above, the mobile device link system in the sixth embodiment of the present invention records the history of user actions executed by a mobile device on the content distributed to the shared monitor. Later the content can be viewed again referring to the history of user actions. Therefore, the user can view part of the content later by simple operation on the content viewed on the shared monitor. Consequently, improvement in the customer attracting effect around the target place can be expected.

The present invention is not limited to the above embodiments but includes many variations. For example, the above embodiments have been described in detail for easy understanding of the present invention; however, the present invention is not limited to a structure which includes all the elements described above. An element of an embodiment may be replaced by an element of another embodiment or an element of an embodiment may be added to another embodiment. For an element of each embodiment, addition, deletion or replacement of another element can be made. The above elements, functions, processing sections, processing means and the like may be, in part or in whole, implemented by hardware, for example, as integrated circuitry. Also, the above elements, functions and the like may be implemented by software so that a processor interprets and executes the program to perform the functions. The information such as programs, tables and files to perform the functions may be placed in a recording device such as a memory, hard disk or SSD (Solid State Drive) or in a recording medium such as an IC card, SD card or DVD.

REFERENCE SIGNS LIST 100, 2402A, 2402B, 2803, 3100A, 3100B, 3100C, 3601, 3901 . . . Mobile device
101, 3105, 3602, 3902 . . . Distribution server
102 . . . Local communication device
103, 2800, 2801, 2802, 3101, 3102, 3103, 3603, 3903 . . . Local communication area
104 . . . Distribution area
106 . . . Recommendation information
107 . . . Right information
2100 . . . Linked device
2400, 3104, 3600, 3900 . . . Shared monitor
2401 . . . Game server

The invention claimed is:

1. A mobile device link system comprising a server, a mobile device communication-connected to the server via a network, and a local communication device communication-connected to the server via the network,
wherein the mobile device includes:
a mobile side wireless communication section which makes wireless communication with the server via the network;
a local wireless communication section which makes local wireless communication with the local communication device and receives local communication device identifying information to identify the local communication device uniquely;
a position information acquiring section which acquires position information of the mobile device;
a distribution area deciding section which decides whether or not the mobile device has entered a distribution area including the outside of a local communication area of the local communication device, according to the position information;
a recommendation information management section which, if the mobile device is decided to have entered the distribution area, creates a recommendation information request message to request the server to distribute recommendation information to recommend a user having the mobile device to move to a place of installation of the local communication device and manages the recommendation information received from the server;
a right information management section which creates a right information request message for requesting the server right information indicating that the mobile device has right to receive service information from the server, the right information request message containing the local communication device identifying information, and manages the right information received from the server; and
a service processing section which creates a service request message for requesting the server to transmit the service information using the right information and performs a process according to the received service information,
the local communication device includes:
a device side local wireless communication section which transmits the local communication device identifying information by local wireless communication; and
a device side communication section which makes communication with the server via the network, and
the server includes:
a server side communication section which makes communication with each of the mobile device and the local communication device via the network;
a recommendation information creating section which, in response to the recommendation information request message, creates a recommendation information response message containing recommendation information corresponding to the distribution area which the mobile device has entered;
a local communication area information storage section which stores the local communication device identifying information received from the local communication device via the network and local communication area information associated with the right information allowed to be transmitted only to the mobile device in the local communication area of the local communication device identified by the local communication device identifying information;
a right information creating section which, in response to the right information request message, refers to the local communication area information, identifies right information corresponding to the local communication device identifying information contained in the right information request message, and creates a right information response message containing the right information; and
a service provision processing section which, in response to the service request message, performs authentication using the right information contained in the service request message and if the authentication is successful, creates a service response message containing the service information.

2. A mobile device link system comprising a server, a mobile device communication-connected to the server via a network, and a local communication device communication-connected to the server via the network,
wherein the mobile device includes:
a mobile side wireless communication section which makes wireless communication with the server via the network;
a local wireless communication section which makes local wireless communication with the local communication device and receives local communication device identifying information to identify the local communication device uniquely;
a position information acquiring section which acquires position information of the mobile device;

a recommendation information management section which manages recommendation information received from the server to recommend a user having the mobile device to move to a place of installation of the local communication device;

a right information management section which creates a right information request message for requesting the server right information indicating that the mobile device has right to receive service information from the server, the right information request message containing the local communication device identifying information, and manages the right information received from the server; and a service processing section which creates a service request message for requesting the server to transmit the service information using the right information and performs a process according to the received service information, the local communication device includes:

a device side local wireless communication section which transmits the local communication device identifying information by local wireless communication; and a device side communication section which makes communication with the server via the network, and the server includes:

a server side communication section which makes communication with each of the mobile device and the local communication device via the network;

a distribution area deciding section which decides whether or not the mobile device has entered a distribution area including the outside of a local communication area of the local communication device, according to the position information received from the mobile device;

a recommendation information creating section which, if the mobile device is decided to have entered the distribution area, creates the recommendation information corresponding to the distribution area which the mobile device has entered;

a local communication area information storage section which stores the local communication device identifying information received from the local communication device via the network and local communication area information associated with the right information allowed to be transmitted only to the mobile device in the local communication area of the local communication device identified by the local communication device identifying information;

a right information creating section which, in response to the right information request message, refers to the local communication area information, identifies right information corresponding to the local communication device identifying information contained in the right information request message, and creates a right information response message containing the right information; and a service provision processing section which, in response to the service request message, performs authentication using the right information contained in the service request message and if the authentication is successful, creates a service response message containing the service information.

3. The mobile device link system according to claim 1 or 2, wherein at least one or more mobile devices are present in the local communication area of the local communication device, the right information request message transmitted from each mobile device further contains mobile device identifying information to identify the mobile device uniquely, and the right information creating section reads the local communication device identifying information and the mobile device identifying information which are contained in the right information request message, and stores the read mobile device identifying information in association with the same local communication device identifying information as the read local communication device identifying information in the local communication area information.

4. The mobile device link system according to claim 1, wherein the recommendation information contains first deadline information, and the mobile device acquires the right information only when time of reception of the local communication device identifying information is before the first deadline contained in the recommendation information.

5. The mobile device link system according to claim 1, further comprising:

a linked device communication-connected to the server via the network, wherein the linked device includes:

a linked device side wireless communication section which makes wireless communication with the server via the network, the local communication area information of the server further stores linked device identifying information to identify the linked device uniquely, in association with the local communication device identifying information and right information corresponding thereto, the service request message sent by the mobile device contains a command to be executed by the server and the right information, and the service provision processing section creates a service response message containing information after service processing, which indicates a result after execution of a command contained in the service request message, and transmits the service response message to the linked device instead of the mobile device.

6. The mobile device link system according to claim 5, wherein the linked device is a monitor, and the command is a command to specify an image to be displayed on the monitor, a game command to enable a game displayed on the monitor to progress or a command to specify an enlivening content to be displayed as superimposed on the image displayed on the monitor.

7. The mobile device link system according to claim 5, wherein the linked device includes a first monitor and a second monitor, the command is a game command to enable a game displayed on the first monitor and the second monitor to progress, the mobile device includes a first mobile device having acquired right information associated with the first monitor and a second mobile device having acquired right information associated with the second monitor, and upon reception of a service request message containing the game command concerning the game displayed on the first monitor and the second monitor from the first mobile device and the second mobile device respectively, the service provision processing section enables the game to progress according to the command and sends a service response message indicating a result thereof to the first monitor and the second monitor simultaneously.

8. The mobile device link system according to claim 5, wherein the linked device is a monitor,
the command is an enlivening content to be displayed as superimposed on an image displayed on the monitor, and
the service provision processing section of the server performs totalization of times of display of the enlivening content contained in a service request message transmitted from the same local communication area and outputs a result of the totalization.

9. The mobile device link system according to claim 5, wherein the linked device is a monitor,
the service request message sent from the mobile device or the right information request message further contains user information containing a user attribute of the mobile device, and
the service provision processing section reads the user information, creates a service response message containing an advertisement content selected according to the user information and sends the service response message to the monitor.

10. The mobile device link system according to claim 5, wherein an external communication device is connected to the server via the network,
the linked device is a monitor,
the service processing section sends user action information as an operation command for a content displayed on the monitor with the right information or mobile device identifying information to identify the mobile device uniquely added thereto, to the server, and
the service provision processing section performs a process for the content according to the operation command indicated by the user action information, stores the content in association with the user action information in a content storage section, and upon reception of a user action request message for requesting a user action information list containing the identifying information of the mobile device transmitting the user action information or the right information from the external communication device, sends back the user action information list in response thereto, and upon reception of specified information of user action information in the user action information list from the external communication device, sends back the content subjected to the process according to the operation command contained in the user action information, to the external communication device.

11. A service information distribution method, including a server, a mobile device communication-connected to the server via a network, and a local communication device communication-connected to the server via the network, the method comprising:
a step of acquiring position information of the mobile device;
a step of the server or the mobile device deciding whether or not the mobile device has entered a distribution area including the outside of a local communication area of the local communication device, according to the position information;
a step of, if the mobile device is decided to have entered the distribution area, the server creating and transmitting recommendation information to recommend a user having the mobile device to move to a place of installation of the local communication device;
a step of the mobile device receiving the recommendation information;
a step of the mobile device making a display according to the recommendation information for the user;
a step of the mobile device receiving local communication device identifying information to identify the local communication device uniquely through local wireless communication with the local communication device;
a step of the mobile device creating a right information request message for requesting the server right information indicating that the mobile device has right to receive service information from the server, the right information request message containing the local communication device identifying information, and transmitting the message to the server;
a step of the server receiving the right information request message;
a step of, in response to the right information request message, the server creating a right response message containing right information associated with the local communication device, according to the local communication device identifying information, and sending back the message to the mobile device;
a step of the mobile device sending a service request message containing the right information and requesting distribution of the service information, to the server;
a step of the server performing authentication according to the right information contained in the service request message;
a step of, if the authentication is successful, the server creating and distributing a service response message containing the service information for the mobile device; and
a step of the mobile device receiving the service response message.

12. The service information distribution method according to claim 11,
wherein the recommendation information contains first deadline information, and
the mobile device acquires the right information only when time of reception of the local communication device identifying information is before the first deadline contained in the recommendation information.

13. The service information distribution method according to claim 12, further comprising:
an action deciding step of deciding whether or not the user has done a given action using the right information;
an area exit step of deciding whether or not the mobile device has moved out of a local communication area of the local communication device or the distribution area; and
a step of, if at the area exit step the mobile device is decided to have moved out of the local communication area or the distribution area, the server sending a message corresponding to a result of the action deciding step, to the mobile device.

14. The service information distribution method according to claim 12,
wherein the right information contains second deadline information, and the method further comprises:
- a step of the server detecting presence of the local communication device in the local communication area; and
- a step of the mobile device updating the second deadline information while the presence of the mobile device in the local communication area is detected.

* * * * *